US012614217B1

(12) United States Patent
Ambrose et al.

(10) Patent No.: US 12,614,217 B1
(45) Date of Patent: Apr. 28, 2026

(54) METHODS AND SYSTEM FOR IMAGE-BASED ANALYSIS FOR INTELLIGENT ITEM IDENTIFICATION AND UTILIZATION

(71) Applicant: Afterpay Limited, Melbourne (AU)

(72) Inventors: Jason Ambrose, Austin, TX (US); Jon Lagomarsino, San Francisco, CA (US); Melissa Parker Hughes, Sausalito, CA (US); Chloe Saintilan, New York, NY (US)

(73) Assignee: Afterpay Pty Ltd, Melbourne (AU)

( * ) Notice: Subject to any disclaimer, the term of this patent is extended or adjusted under 35 U.S.C. 154(b) by 185 days.

(21) Appl. No.: 17/885,063

(22) Filed: Aug. 10, 2022

(51) Int. Cl.
G06Q 30/0601 (2023.01)
G06Q 40/02 (2023.01)
G06V 30/19 (2022.01)
G06V 30/22 (2022.01)

(52) U.S. Cl.
CPC ......... *G06Q 30/0611* (2013.01); *G06Q 40/02* (2013.01); *G06V 30/19147* (2022.01); *G06V 30/22* (2022.01); *G06Q 30/0601* (2013.01)

(58) Field of Classification Search
CPC .................. G06Q 30/0601–0643; G06Q 30/08
USPC ................................................ 705/26.1–27.2
See application file for complete search history.

(56) References Cited

U.S. PATENT DOCUMENTS 8,401,968 B1 3/2013 Schattauer et al.
10,650,422 B1 * 5/2020 Benkreira .......... G06Q 30/0283

11,348,085 B2 5/2022 Molnar et al.
11,514,437 B1 11/2022 Jarosch et al.
11,588,802 B2 2/2023 Way
2009/0112744 A1 4/2009 Park et al.
2009/0144193 A1 6/2009 Giordano et al.
2011/0202874 A1 8/2011 Ramer et al.
2011/0208659 A1 8/2011 Easterly et al.
2012/0143753 A1 6/2012 Gonzalez et al.
2012/0150731 A1 6/2012 Isaacson et al.
2012/0179531 A1 7/2012 Kim
2012/0290950 A1 11/2012 Rapaport et al.
2014/0129422 A1 5/2014 Zhou et al.
2015/0006426 A1 1/2015 Sobhani et al.

(Continued)

FOREIGN PATENT DOCUMENTS

JP 2023-041750 A 3/2023
WO 2011/140301 A1 11/2011

OTHER PUBLICATIONS

Dewan, N. (Jan. 7, 2021, Jan. 7, 2021). Eyeing those jeans? 'buy now, pay later' in installments [money]. The Economic Times Retrieved from https://dialog.proquest.com/professional/docview/2475542352?accountid=131444 (Year: 2021).*

(Continued)

*Primary Examiner* — Ashley D Preston
(74) *Attorney, Agent, or Firm* — Lee & Hayes, P.C.

(57) ABSTRACT

Techniques described herein are directed to image-based analysis for intelligent item identification and utilization. Image data corresponding to an image of a list of items may be analyzed to determine what the items on the list are, and thereafter interaction data and machine-trained models may be utilized to determine merchant offerings for the items to display to a user. Various payment options may be presented to the user and utilized in association with a payment service.

20 Claims, 14 Drawing Sheets

(56)     References Cited

U.S. PATENT DOCUMENTS

| | | |
|---|---|---|
| 2016/0117651 A1 | 4/2016 | Davis |
| 2016/0117665 A1 | 4/2016 | Davis |
| 2016/0117666 A1 | 4/2016 | Davis et al. |
| 2016/0117670 A1 | 4/2016 | Davis et al. |
| 2019/0295064 A1* | 9/2019 | Malo .................... G06Q 20/201 |
| 2021/0174435 A1 | 6/2021 | Reses et al. |
| 2022/0188915 A1* | 6/2022 | Nariani .................. G06Q 30/08 |
| 2022/0351214 A1* | 11/2022 | Klein ................... G06Q 30/018 |
| 2023/0045946 A1 | 2/2023 | Duane et al. |
| 2023/0047509 A1 | 2/2023 | Dhodapkar |
| 2023/0206062 A1* | 6/2023 | Scherwitz .......... G06Q 30/0282 |
| | | 706/25 |
| 2023/0410080 A1* | 12/2023 | Singh .................... G06Q 20/24 |

OTHER PUBLICATIONS

Dewan, N. (Jan. 7, 2021, Jan. 7, 2021). Eyeing those jeans? 'buy now, pay later' in installments [money]. The Economic Times Retrieved from https://dialog.proquest.com/professional/docview/2475542352?accountid=131444 (Year: 2021) (Year: 2021).*

Wilson et al. "How we design our hardware," retrieved from <https://wallet.build/how-we-design-our-hardware/>, Oct. 27, 2022, 9 pages.

Search Strategy from Dialog, STIC, ProQuest, Oct. 22, 2022, 3 pages.

* cited by examiner

200

Payment Application

214(b)

218(b)

Option 2
Merchant 2

214(d)

218(d)

Option 4
Merchant 4

Item 1
Option 1
Merchant 1

216(a)
214(a)
218(a)

Item 2
Option 3
Merchant 3

216(b)
214(c)
218(c)

206

Payment Application

Item 1 Text

Item 2 Text

212(a)
210(a)

210(b)
212(b)

Confirm Identified Items

204

208

Notepad

102

202

Figure 4:
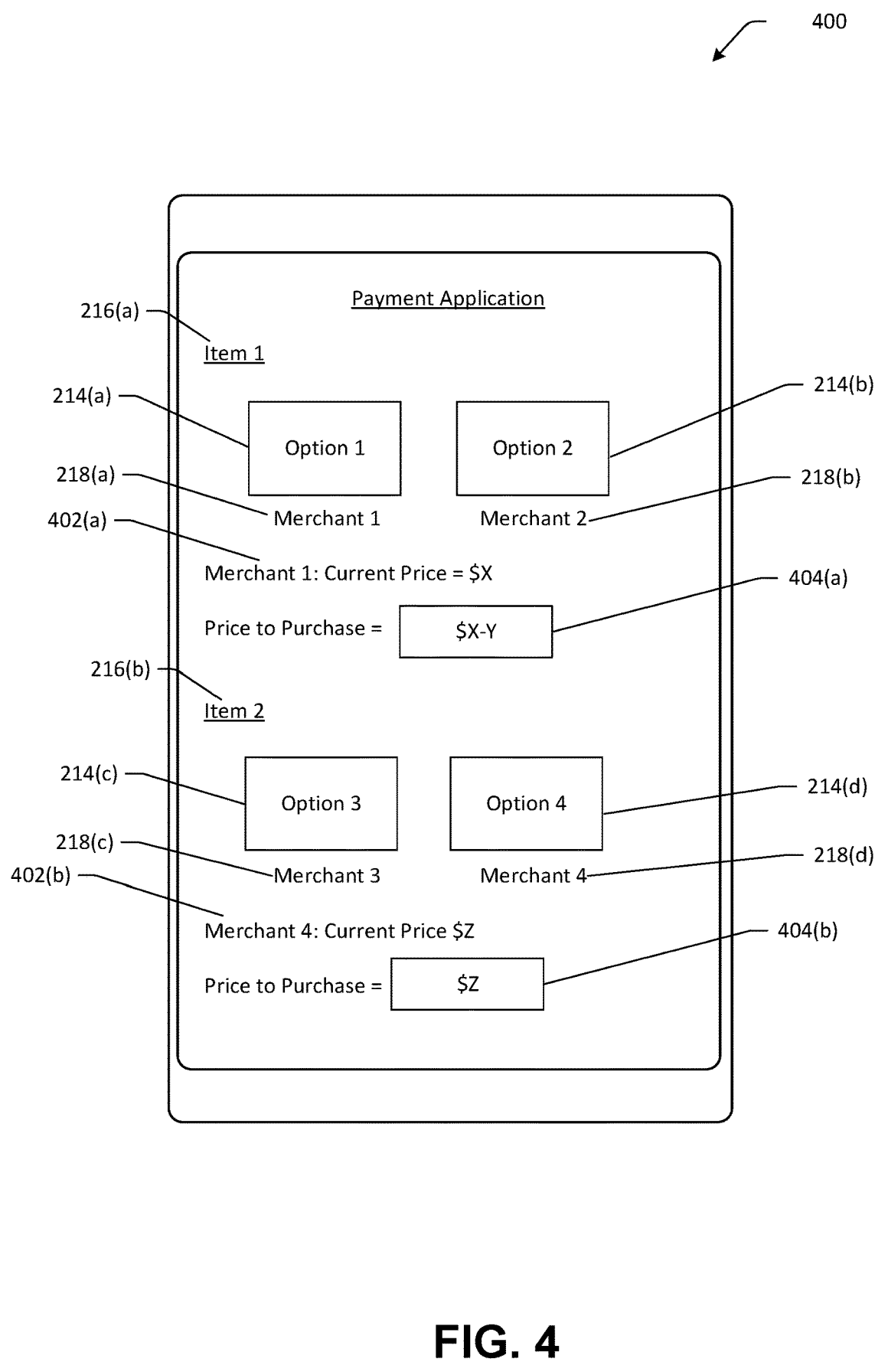

400

Payment Application

216(a)

Item 1

214(a)    Option 1        Option 2    214(b)

218(a)    Merchant 1       Merchant 2    218(b)

402(a)    Merchant 1: Current Price = $X

Price to Purchase =    $X-Y    404(a)

216(b)

Item 2

214(c)    Option 3        Option 4    214(d)

218(c)    Merchant 3       Merchant 4    218(d)

402(b)    Merchant 4: Current Price $Z

Price to Purchase =    $Z    404(b)

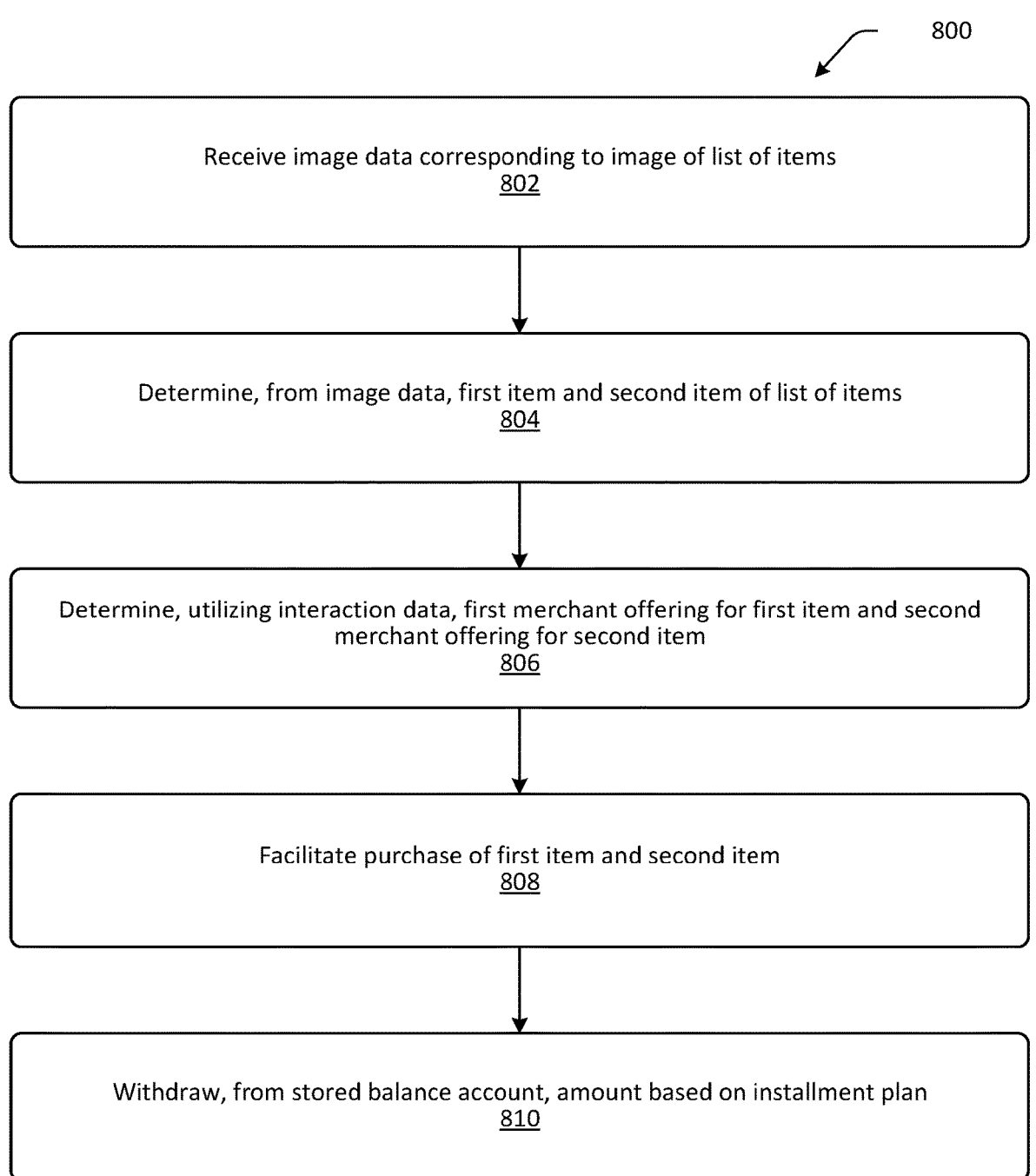

800

Receive image data corresponding to image of list of items
802

Determine, from image data, first item and second item of list of items
804

Determine, utilizing interaction data, first merchant offering for first item and second merchant offering for second item
806

Facilitate purchase of first item and second item
808

Withdraw, from stored balance account, amount based on installment plan
810

FIG. 8

Data Store(s) 1200

User Account(s) 1204

User Account 1220

User Account Data 1228

Account Activity 1230

User Wallet Key(s) 1232

Asset Ledger 1234

Fiat Currency Ledger 1236

Other Ledger(s) 1238

Asset Wallet 1240

Holding Account 1242

Asset Storage 1202

Asset Wallet 1210

Asset Ledger 1212

Fiat Currency Ledger 1214

Other Ledger(s) 1216

Transaction Log 1218

Private Blockchain 1219

1202

METHODS AND SYSTEM FOR IMAGE-BASED ANALYSIS FOR INTELLIGENT ITEM IDENTIFICATION AND UTILIZATION

TECHNICAL FIELD

Applications, which are downloadable and executable on user devices, enable users to interact with other users. Such applications are provided by service providers and utilize one or more network connections to transmit data among and between user devices to facilitate such interactions.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 is an example user interface displayed on an example user device, where the user interface is configured to present price tracking functionality, according to an embodiment described herein.

FIG. 8 is a flow diagram of an example process for image-based analysis for intelligent item identification and utilization.

DETAILED DESCRIPTION

Figure 1:
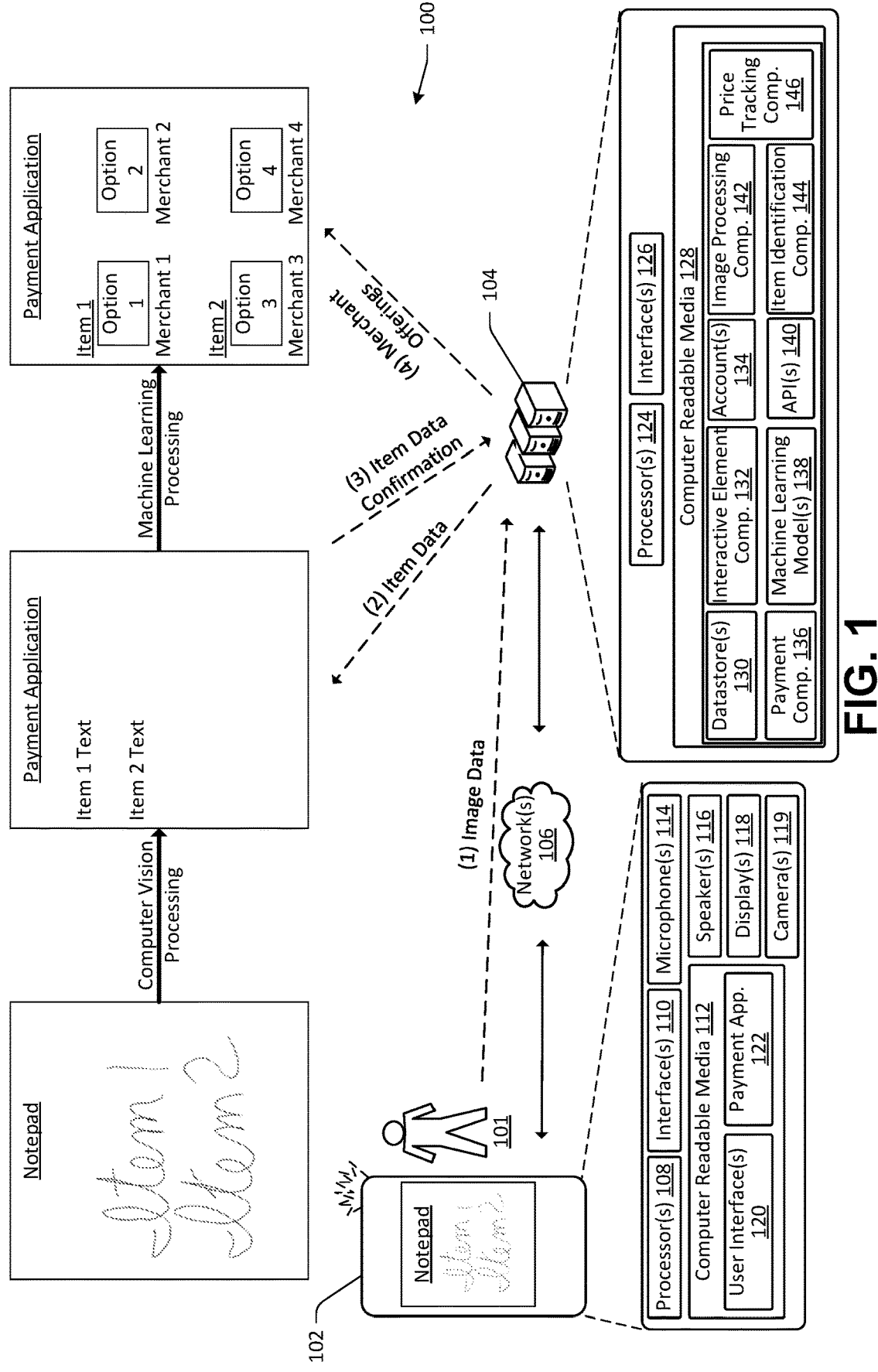
FIG. 1 is an example environment for image-based analysis for intelligent item identification and utilization, according to an embodiment described herein.

Techniques described herein are directed to, among other things, image-based analysis for intelligent item identification and/or utilization. In an example, techniques described herein may be utilized to intelligently generate, from a physical list of one or more items (e.g., a school supply list, a recipe, a to-do list, a shopping list, or the like), a virtual shopping cart, an order, an open ticket, or other channel for facilitating a transaction. In at least one example, the virtual shopping cart, open ticket, order, or other channel can be associated with one or more items, identified using computer processing techniques (e.g., image processing, natural language processing, etc.) from the physical list, that may be offered for purchase, sale, or other acquisition from one or more merchants. In some examples, the generation of the virtual shopping cart, order, open ticket, or other channel can be "intelligent" in that techniques described herein can utilize transaction and/or other interaction data associated with customers and/or merchants, which can be analyzed by one or more machine-trained models, to identify items and/or merchants that are customized and/or personalized for individual users. That is, techniques described herein utilize computer processing techniques and/or machine-trained models to intelligently generate virtual shopping carts, orders, open tickets, or other channels for facilitating transactions from physical lists of item(s).

In an example, a payment application associated with a payment service may be executable by a user device, and a user may utilize a camera, or other sensor, of a user device to capture an image, or other representation, of a list of items. For the purpose of this discussion, a "list of items" can comprise one or more items, which can be goods or services. It should be understood that the list of items, while described in several examples herein as being a handwritten list, may include any physical list of items and need not be in a particular form such as handwriting. Take, for example, a situation where a user writes a list of items on a piece of paper, such as a Christmas list, a birthday list, a shopping list, a to-do list, etc. In some examples, such a list can additionally or alternatively be typed and printed on a physical piece of paper or stored in an electronic format. In some examples, a list can be associated with an audio file, a video file, an image file, or the like.

As described above, in at least one example, a user can utilize a user device to capture an image, or other representation, of a list of items. It should be understood that while the several examples provided herein discuss the capture of a single image, video may also be captured and utilized. Image data corresponding to the image may be generated at the user device and the image data may be processed (e.g., by the payment application and/or server(s) associated with the payment service) using one or more computer processing techniques to identify merchant offerings that correspond to the individual items associated with the list. For example, computer vision techniques may initially be utilized to identify a portion of the image data that corresponds to words. In an example, an image processing component of the payment service may be configured to recognize various objects in the image data and to label those objects. In the example used above, the image processing component may be configured to label a portion of the image data corresponding to words, another portion correspond to a background, or other portions that do not necessarily include words. The portion of the image data that corresponds to words may then be further analyzed by the image processing component to identify text characters of the words. For example, optical character recognition or other text processing functionality may be utilized to determine individual text characters of the words. By so doing, a handwritten list of items, which may be in various handwritten forms given the variance in writing abilities, styles, etc. of users, may be converted into text data representing individual text characters. The image processing component may then utilize, in examples, natural language processing techniques to determine what the words are from the text data. Utilizing a specific but non-limiting example, a handwritten list of items may include a "New Brand A sneaker" item. Once the portion of the image data corresponding to these words is determined, the optical character recognition processing may be utilized to generate text characters, which depending on the clarity of the handwriting, may be determined to be "newbrandasneaker," or some other representation that does not necessarily yet represent words. The natural language processing may be utilized to identify words from the string of text characters, thereby converting "newbrandasneaker" to "new" "brand a" "sneaker."

Once the one or more item names on the item list have been determined by the image processing component, an item identification component may be configured to take the results from the image processing component and determine a merchant offering that corresponds to the item(s) on the list of items. To do so, in some examples, additional data such as interaction data may or may not be available. Such interaction data may include, for example, merchant data, transaction data, customer data, appointment data, inventory data, or other types of data or factors such as those determined to be relevant by machine learning models as described more fully herein. In examples where such data is not available, the item identification component may be configured to utilize the results of the image processing component to perform an internet search or a search in a database associated with the payment service to determine one or more merchant offerings that may correspond to the individual items in the list of items. In other examples, one or more types of the interaction data may be available and may be utilized to determine the merchant offerings. For example, the merchant data may indicate merchants that are associated with the payment service as well as types of items that the merchants sell, locations of the merchants, etc. The transaction data may indicate details about prior transactions with the user at issue, including previous merchants involved in those transactions, items purchased in those transactions, recency of various transactions, etc. The customer data may indicate one or more user preferences associated with the user, prior interactions by the user with the payment service or the payment application (including those interactions not necessarily tied to transactions), etc.

The appointment data may indicate availability of services that may correspond to the item(s) as well as availability of the user in question. The inventory data may indicate availability of goods for sale by the various merchants. The item identification component may be configured to utilize some or all of this data to identify candidate merchant offerings that correspond to the individual items on the list of items. In some examples, the candidate merchant offerings may be determined based at least in part on the words determined from the image data processing described herein, on phrases that correspond to the determined words, or representations of the words such as where a symbol or other non-textual marking is provided by the user.

In some examples, machine learning techniques may be utilized to identify the merchant offerings. For example, a machine learning model may be generated and configured to utilize, as input, some or all of the interaction data as well as the results from the image processing component. The machine learning model may be trained utilizing a training dataset that indicates prior results of the machine learning model and feedback data indicating the accuracy or desirability of the results. A machine-trained model may be generated using the training dataset, and the machine-trained model may be utilized to identify the candidate merchant offerings that correspond to the items in the list of items. In these examples, a number of factors determined to be relevant by the machine-trained model may be utilized to determine which of several candidate merchant offerings is most likely to correspond to the item at issue as written by the user as well as which merchant the user is most likely to desire to make the purchase from. Additional details on the use of machine learning techniques to determine items and merchants is described elsewhere herein.

In addition to the above, the payment service may be configured to allow for additional functionality to be presented to the user in association with the determined list of items. For example, the payment service can configure conditions, automatically or based on user input, that when satisfied can trigger an automatic, truncated, or simplified process for completion of a transaction. For example, a price tracking component may be configured to present price tracking options for the user to select from. In a nonlimiting example, a user list may include Item 1 and Item 2. Once the items are identified and associated merchant offerings determined, indicators of the merchant offerings, an identifier of the item, and identifiers of the merchants from which the item can be purchased may be displayed via a user interface on the user device. In some examples, the user may provide user input selecting a given merchant or merchant offering and may indicate an intent to purchase the item at that time. However, in other examples, a price tracking option may be displayed and may allow a user to provide user input indicating a price (that is less than the current price of the item) that the user would be willing to purchase the item for, such as when the item goes on sale. In this example, the price tracking component may be configured to receive the user input and to store data representing the user-defined price and the item. The price tracking component may periodically or otherwise determine when the price of the item changes, and if the price of the item satisfies the price threshold set by the user, a payment component of the payment service may automatically purchase the item on behalf of the user, or in other examples may send a notification to the user requesting confirmation that the purchase should be made.

Additionally, in examples, when a user expresses an intent to purchase one or more of the items on the list of items, the user may be presented with multiple payment options. While any payment options may be presented, some example payment options may enable payment of the entire purchase at the time of the transaction by a stored balance account, a debit card (which may be linked to the stored balance account or another bank account), a linked bank account, etc. In some examples, options may be presented to the user to enable the user to delay or defer payment for example by use of a credit card, loan or other financing offer, or the like. In one example, payment installment plan options may be presented to the user. An installment plan or installment loan is a loan or other advance of funds that is issued to a user at a particular time and repaid in one or more installments over a period of time. As described in more detail herein, the payment installment plans may provide different options for an installment frequency or a total amount of time over which installments on the installment plans may be made. For example, a given installment plan may be to make four installments over a six-week period of time, or six installments over a two-month period of time, or ten installments over a four-month period of time, etc.

In association with the operations described above, the techniques in this disclosure allow for the digitization of a physical list of items utilizing automated processes and multiple different analysis techniques. For example, computer vision techniques are utilized to transform a physical list of items as depicted in image data to data indicating the items, attributes of the items, relationships between items, etc. Each of these techniques individually could not be performed by a human, and the combination of these techniques to achieve the results described herein go far beyond what a human could hope to achieve. As described herein, a user need only capture a photo of the physical list and the computer vision techniques are utilized to automatically parse portions of image data that are associated with the items from non-item portions of the image data. Additionally, optical character recognition techniques are utilized to determine characters and words from pixels in the resulting data from the computer vision processing. Furthermore, natural language understanding techniques are utilized to determine a meaning or phrase structure of the words from the text data generated from the optical character recognition techniques. These processes provide a benefit over existing techniques by leveraging multiple disparate data processing techniques to transform a physical list of items into a digitized list that can be utilized by the described payment service to identify merchant offerings and facilitate transactions with little to no input from the user.

Furthermore, in an ecommerce setting, one or more computing platforms are involved in the hosting of thousands of items offered by thousands of merchants, with the availability of those items changing second by second and merchant by merchant. As such, even when lists in a physical list of items are identified using the data analysis techniques described herein, parsing the thousands of potential merchant offerings to identify the one or few merchant offerings to display as a purchasing option to a given user represents a data management problem that must be solved in a time sensitive manner to achieve a meaningful result for the user. As outlined herein, data associated with the user at issue, data associated with the item(s) at issue, data associated with the payment service, etc. is queried, processed, and utilized to identify which merchant offering(s) to associate with which identified item from the list of items. Doing so includes the use of specifically-trained machine learning models that are utilized to more accurately determine merchant offerings. These processes provide a benefit over existing techniques by performing on-the-fly processing of data from many data sources all between when a user captures a photograph of the list in question and when a merchant offering option is displayed to a user, often in a matter of seconds or less.

Additionally, with the proliferation of computing platforms for sharing information and for performing transactions, there is a computer-centric problem of integrating functionality of disparate computing platforms and what would otherwise require manual user item input and item searching in a way that promotes a computer-centric item identification, search, and display. For example, as described above, one computing platform is responsible for determining items from the list of items using techniques, such as computer vision, automatic speech recognition, natural language processing, etc., that are performed by computers. Then, one or more computing platforms are involved in the hosting of thousands of items offered by thousands of merchants, with the availability of those items changing second by second and merchant by merchant, also described above. To correlate items in the list of items with merchant offerings with minimal user input such that, for example, a user need only take a picture of a list and then confirm purchase of identified merchant offerings, is a computer-centric solution that has no human-based corollary.

Additionally, ecommerce transactions are historically limited to single-merchant transactions due to authentication requirements and digital communication restraints between user devices, merchant devices, payment service systems, and payment instrument institutions. Given the complex nature of sending personal account numbers and authentication information through and to each of these devices and systems, often times requiring multiple levels of encryption and decryption in a short period of time, current systems are not configured to complete a digital transaction that involves more than one merchant. The computer-centric solutions described herein allow for the payment service to facilitate multiple transactions with various merchants (e.g., a merchant for each of the items in the list of items) by generating user-specific and transaction-specific interactive elements embedded with data that allows a user to select the items for sale and to securely communicate data associated with the transaction such that the described payment service can communicate with payment instrument institutions as well as systems storing user balance accounts to cause a transaction to be performed with multiple merchants utilizing the communication protocols and authentication requirements of those various systems and without requiring coding changes by such systems. This can be performed by the payment service utilizing a standardized format for communicating transaction updates between users and with merchant systems.

In addition to the above, the nature of ecommerce transactions is time sensitive. For example, in a non-ecommerce transaction a user may go to a store, pick out an available item, and initiate a transaction at a cash register at any point thereafter. Ecommerce transactions, to the contrary, involve thousands of potential customers across thousands of locations purchasing items. As such, item availability changes second by second, and the display of item availability needs to be updated dynamically, on-the-fly, and based on potentially hundreds or thousands of user sessions involving a given merchant. These computer-centric problems are minimized utilizing the techniques described herein by allowing for the on-the-fly identification multiple items, generation of user-specific interactive elements for individual merchant offerings for purchase of those items, and then the facilitation of multiple transactions with various merchants within a limited time window.

Furthermore, the techniques described herein include the generation and training of machine learning models to, among other things, generate time sensitive actionable recommendations, interactive elements including interactive elements associated with merchant offerings, and payment options associated with transactions described herein. Machine learning can also be utilized to determine which of several potential merchant offers should be surfaced to a user for each item in a list of items as described herein. The use of specifically trained machine learning models grounds the techniques described herein in a computer-centric environment and produces results that offer improvements over conventional technologies. These improvements include, for example, time sensitive identification of items in a list of items, determinations on how interactive elements should be formatted for given users and given items, which merchant offerings to surface for the items in the list of items, selection of potential installment plan options, etc. The models may be trained again and again over time, each time learning new parameters or updating parameter weighting to make the results of those models more accurate, more timely, etc.

Also, transactions such as those described herein require data transmission across disparate devices and systems all within a limited period of time. This would typically lead to networking issues in the network of devices where communication protocols across the various device and system type typically differ. However, utilizing the techniques described herein, a network of user devices and systems such as the payment service may be generated when transactions such as those described herein are identified. To do so, merchant profiles are parsed to determine which merchants are to be involved in a transaction for the multiple items on the list of items, which devices are associated with those merchants, and parameters for sending and displaying interactive elements associated with the items sold by those merchants. The established network of devices and system is then utilized to securely send data related to the transaction to the various devices and systems.

As described above, in some examples, techniques described herein may present installment plan options for users to select an installment plan. A user interface may be presented on the user device with options for the user to select the desired installment plan for any given item in the list of items or an aggregation of the items. By so doing, users may customize how they pay for multiple items on the list over time. Additionally, this user interface represents an improvement over existing user interfaces in that it is generated dynamically based on an analysis of the item(s) at issue, the user at issue, and past user of installment plans. By so doing, a limited set of information that is relevant and applicable to the user at issue is presented without additional unnecessary or unusable options being displayed. Given that many users utilize devices with small, limited screen size, the ability to dynamically identify and display relevant installment plan options to a user in such a limited-size screen improves over more conventional user interfaces.

It should be noted that the exchange of data and/or information as described herein may be performed where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed where a user has provided consent for performance of the operations.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 is an example environment 100 for integration of image-based analysis for intelligent item identification and utilization, according to an embodiment described herein. The environment 100 of FIG. 1 may include a user 101 associated with a user device 102 and a payment service 104, which can communicate via network(s) 106. A user 101 can be any customer that initiates a transaction as described herein. Each of the devices can comprise one or more computing devices. Additional details associated with the user device 102, the payment service 104, and the network(s) 106 are described below with reference to FIGS. 10-14.

The user device 102 may include one or more components such as one or more processors 108, one or more network interfaces 110, computer-readable media (CRM) 112, one or more microphones 114, one or more speakers 116, one or more displays 118, and one or more cameras 119. The microphones 114 may be configured to receive audio input from the environment 100 and to generate corresponding audio data, which may be utilized as discussed herein. The speakers 116 may be configured to output audio, such as audio associated with a given transaction. The displays 118 may be configured to present graphical user interfaces. In some examples, the displays 118 can output images, videos, or the like via such graphical user interfaces. The cameras 119 may be configured to capture images and to generate corresponding image data.

The CRM 112 may include one or more applications or other components. For example, the one or more applications or other components can include one or more user interface(s) 120 and a payment application 122. A user interface 120 can be included in the payment application 122 as an interstitial, widget, or pop-up display. The CRM 112 can include additional or alternative applications such as a music streaming application, a messaging application, an email application, a forum application, a photo application, or the like. In some examples, the applications can be provided by a same service provider (e.g., the payment service) or different service providers, such as the payment service and one or more third-party service providers.

The applications or other components may be configured to execute in the foreground and background of the device 102. For example, the payment application 122 may be configured to execute in the foreground when a user is actively engaged in one or more of the functionalities of the payment application 122. In other examples, the payment application 122 may be configured to execute in the background when a user is not actively engaged in one or more of the functionalities, but the payment application 122 is still "open" and is capable of communicating with other applications on the device 102 and/or with payment service 104 associated with the payment application 122. For example, an image application may be executing in the foreground and an interaction with an interactive element as described in more detail herein may occur. The payment application 122, running in the background, may be caused to be displayed in the foreground in response to selection of the interactive element in the image application. In some such examples, the payment application 122 can transition to the foreground to perform payment operations or can remain in the background and payment operations can be performed without the payment application 122 transitioning to the foreground. In other examples, the payment application 122 itself may be utilized to display interactive elements associated with item identification as described herein. It should be understood that the user interfaces 120 described herein may include the payment application 122 and may include one or more other user interfaces as described herein. It should also be understood that the payment application 122 or the functionality associated therewith can be integrated other applications, such as third-party applications.

The payment service 104, which can be associated with one or more computing devices, such as server computing devices, may include components such as one or more processors 124, one or mor network interfaces 126, and/or CRM 128. The CRM 128 may include one or more components such as, for example, datastore(s) 130, an interactive element component 132, one or more accounts 134, a payment component 136, one or more machine learning models 138, one or more application programming interfaces (APIs) 140, an image processing component 142, an item identification component 144, and a price tacking component 146. These components will be described below by way of example.

In at least one example, the payment service 104 can expose functionality and/or services via the one or more APIs 140, thereby enabling functionality and/or services described herein to be integrated into various functional components of the environment 100. The API(s) 140, which can be associated with the payment service 104, can expose functionality described herein and/or avail payment services to various functional components associated with the environment 100. At least one of the API(s) 140 can be a private API, thereby availing services and/or functionalities to functional components (e.g., applications, etc.) that are developed internally (e.g., by developers associated with the payment service). At least one of the API(s) 140 can be an open or public API, which is a publicly available API that provides third-party developers (e.g., photograph platforms described herein) with programmatic access to a proprietary software application or web service of the payment service. That is, the open or public API(s) can enable functionality and/or services of the payment service to be integrated into one or more applications. The API(s) 140 can include sets of requirements that govern how applications, or other functional components, can interact with one another.

In some examples, the payment service 104 can provide third-party entities with a software developer kit ("SDK") that may utilize functionality exposed by the API(s) 140. The SDK can include software development tools that allow a third-party developer (i.e., a developer that is separate from the payment service) to include functionality and/or avail services as descried herein. The SDK and/or the API(s)

140 may include one or more libraries, programming code, executables, other utilities, and documentation that allows a developer to directly include functionality and/or avail services described herein within an application.

The datastore(s) 130 can store, among other types of data, user profiles. For instance, a user profile of the user can store payment data associated with payment instrument(s) or user account(s) of a user. In some examples, an account maintained by the payment service 104 on behalf of the user can be mapped to, or otherwise associated with, the user profile. Such an account can be associated with a stored balance maintained by the payment service 104. In some examples, funds associated with the stored balance can be received from peer-to-peer payment transactions (e.g., payment transactions between users), deposits from employers, transfers from external accounts of the user, and so on. In some examples, a user profile can indicate multiple user accounts or stored balances associated with a user profile, which can be associated with different assets, such as stocks, cryptocurrency, non-fungible tokens, or the like. In some examples, a user profile can include historical group data, geographic data, customer preferences, subject matter preferences, transaction data, contacts data, social relationship data, user preferences, metadata tag data, and other information associated with participation in the transactions described herein. Additional details associated with data that can be stored in association with user profiles are provided below.

With respect to the image processing component 142, the user may utilize the camera 119 of the user device 102 to capture the image of a list of items. In some examples, the camera 119 can be native to the user device 102. In some examples, the camera 119 can be integrated into the payment application 122. Image data corresponding to the image may be generated at the user device 102 and that image data may be sent to the payment service 104. The payment service 104 may receive the image data and may initiate a process for identifying individual items from the text and for identifying merchant offerings that correspond to the individual items. For example, the image processing component 142 may initially utilize computer vision techniques to identify a portion of the image data that corresponds to words.

As used herein, "computer vision" can refer to methods for acquiring, processing, analyzing, and understanding image and/or other high-dimensional data to produce numerical or symbolic information, e.g., in the form of decisions, including determining what portions of image data correspond to items for purchase and what portions of image data are background or are otherwise not associated with items for purchase. "Understanding" image and/or other high-dimensional data can be done by one or more components transforming image data into machine-readable descriptions. As a result, the one or more components can "understand" the image and/or other high-dimensional data by disentangling symbolic information from image data using models constructed with the aid of geometry, physics, statistics, and learning theory. In some examples, computer vision can automate and/or integrate a wide range of processes and representations for vision perception. In some examples, outputs of computer vision can comprise various forms, including but not limited to, video sequences, views from multiple cameras, or multi-dimensional data from a scanner. Computer vision seeks to apply its theories and models for the construction of computer vision systems.

One aspect of computer vision comprises determining whether or not the image data contains some specific object, feature, or activity. Different varieties of computer vision recognition include object recognition (also called object classification), wherein one or several pre-specified or learned objects or object classes can be recognized, usually together with their 2D positions in the image or 3D poses in the scene. Another variety may be identification, wherein an individual instance of an object, such as an item in a list of items is recognized. Examples include identification of a specific person's face or fingerprint, identification of hand-written digits, or identification of a specific vehicle. Another variety may be detection, where the image data are scanned for a specific condition, such as the presence of merchant identifiers, prices, etc. Detection based on relatively simple and fast computations is sometimes used for finding smaller regions of interesting image data that can be further ana-lyzed by more computationally demanding techniques to produce a correct interpretation. Here, the computer vision models may be trained to identify strings of words, textual characteristics, or other textual objects specifically.

Several specialized tasks based on computer vision rec-ognition exist. Those tasks may include Optical Character Recognition (OCR), which involves identifying characters in images of printed or handwritten text, usually with a view to encoding the text in a format more amenable to editing or indexing (e.g., ASCII). Another task may be 2D Code Reading, which involves reading of 2D codes such as a data matrix and QR codes. Another task may include facial recognition. Another task may include shape recognition technology (SRT), which involves differentiating human beings (e.g., head and shoulder patterns) from objects or a list or piece of paper from a background on which the paper is situated.

Some functions and components (e.g., hardware) found in the computer vision systems described here may include one or several image sensors, which, besides various types of light-sensitive cameras, may include range sensors, tomog-raphy devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false infor-mation, contrast enhancement to assure that relevant infor-mation can be detected, and scale space representation to enhance image structures at locally appropriate scales. Image features at various levels of complexity may then be extracted from the image data. Typical examples of such features are: lines, edges, and ridges; localized interest points such as corners, blobs, or points; or more complex features may be related to texture, shape, or motion. At some point in the processing a decision may be made about which image points or regions of the image are relevant for further processing, such as which points or regions are associated with a piece of paper, recognized text, etc. Examples of this may include: selection of a specific set of interest points; segmentation of one or multiple image regions that contain a specific object of interest (e.g., a list); and segmentation of the image into nested scene architecture comprising fore-ground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters; classifying a detected object into dif-ferent categories; and comparing and combining two differ-ent views of the same object. Making the final decision required for the application, for example match/no-match in recognition applications, may then be performed. By so doing, the computer vision techniques may be utilized to select a set of interest points from the image data that correspond to textual characters and these points of interest may be utilized for further processing to determine what the textual characters represent, including through the use of optical character recognition and natural language under-standing.

Utilizing the computer vision techniques described herein, the image processing component 142 may be con-figured to recognize various objects in the image data and to label those objects. In the example used above, the image processing component 142 may be configured to label a portion of the image data corresponding to words, another portion correspond to a background, or other portions that do not necessarily include words. The portion of the image data that corresponds to words may then be further analyzed by the image processing component 142 to identify text char-acters of the words. For example, optical character recog-nition or other text processing functionality may be utilized to determine individual text characters of the words. By so doing, a handwritten list of items, which may be in various handwritten forms given the variance in writing abilities, styles, etc. of users, may be converted into text data repre-senting individual text characters. That is, the image pro-cessing component 142 can take raw, unstandardized input data and, using one or more computer vision techniques, can standardize the data for further processing.

The image processing component 142 may then utilize, in examples, natural language processing techniques to deter-mine what the words are from the text data. Utilizing a specific but non-limiting example, a handwritten list of items may include a "New Brand A sneaker" item. Once the portion of the image data corresponding to these words is determined, the optical character recognition processing may be utilized to generate text characters, which depending on the clarity of the handwriting, may be determined to be "newbrandasneaker," or some other representation that does not necessarily yet represent words. The natural language processing may be utilized to identify words from the string of text characters, thereby converting "newbrandasneaker" to "new" "brand a" "sneaker." In examples, the natural language processing techniques may include the tagging of certain words with meaning identifiers. Using the same example, the tags may include a "condition" tag with the payload in this example being "new," an "item type" tag with the payload in this example being "sneaker" or "shoe," and a "brand" tag with the payload in this example being "Brand A."

In some examples, the list of items described herein can additionally or alternatively be typed and printed on a physical piece of paper or stored in an electronic format. In some examples, a list can be associated with an audio file, a video file, an image file, or the like. In these examples, processing of these list formats may differ as between each other. For example, if the user uploads a file representing the list, an analysis of the file type and type of data associated with the file may be performed. For example, in some situations the file type may be a .jpeg or .gif that represents image data. In other examples the file type may be a movie-related file type. In still other examples, the file type may be a .doc or similar word processing file type. In still other examples, the file type may be an audio file type such as .mp3 or .wav. The payment service 104 may utilize this information to determine how to analyze the file. When the file type is associated with text data, textual analysis as described herein may be performed to determine the items in the list of items. When the file type is associated with image data or video data, image processing such as through the use of computer vision techniques may be performed to determine the items in the list of items. When the file type is associated with audio data, automatic speech recognition techniques may be utilized to parse the portion of the audio data representing user speech from the balance of the audio data and to generate text data representing words of the speech input.

It should be understood that while the image processing component 142 is shown with respect to the payment service 104, the image processing component 142 may be stored in association with the user device 102. In these examples, any or all of the image processing operations described herein may be performed by the user device 102. Additionally, any operations described herein as being performed by the payment service 104 may be performed by the user device 102.

Using FIG. 1 as an example, a user may capture an image of a notepad with two handwritten items on it, "Item 1" and "Item 2." The image data can be transmitted from the user device 102 to the payment service 104 as shown by the dashed arrow labeled "(1) image data." The image processing component 142 may perform the operations described above to determine actual items that the handwritten text refers to and may discuss a digitized version of the handwritten items in association with the payment application 122. In FIG. 1, text representations of Item 1 and Item 2 may be presented. That is, the payment service 104 can send item data, as shown by the dashed arrow labeled "(2) item data," to the user device 102 to cause the text representations of the item(s) on the list to be presented via the user interface presented by the payment application.

Once the one or more item names on the item list have been determined by the image processing component 142, the item identification component 144 may be configured to take the results from the image processing component and determine an actual merchant offering that corresponds to the item(s) on the list of items. In some examples, additional data such as interaction data may be available. Such interaction data may include, for example, merchant data, transaction data, customer data, appointment data, inventory data, or other types of data or factors such as those determined to be relevant by machine learning models 138 as described more fully herein. For example, the merchant data may indicate merchants that are associated with the payment service 104 as well as types of items that the merchants sell, locations of the merchants, etc. The transaction data may indicate details about prior transactions with the user at issue, including previous merchants involved in those transactions, items purchased in those transactions, recency of various transactions, etc. The customer data may indicate one or more user preferences associated with the user, prior interactions by the user with the payment service 104 or the payment application 122 (including those interactions not necessarily tied to transactions), etc. Examples of such interaction data may include sizing preferences of a user, color preferences of a user, merchant preferences of a user, or other data indicating prior interactions by the user with the payment service 104. The appointment data may indicate availability of services that may correspond to the item(s) as well as availability of the user in question. The inventory data may indicate availability of goods for sale by the various merchants. The item identification component 144 may be configured to utilize some or all of this data to identify candidate merchant offerings that correspond to the individual items on the list of items.

Using FIG. 1 as an example, the payment application 122 may be updated from displaying the digitized text of the handwritten items to displaying merchant offerings associated with those items. As shown in FIG. 1, for Item 1, merchant offering Option 1 from Merchant 1 and merchant offering Option 2 from Merchant 2 are displayed. For Item 2, merchant offering Option 3 from Merchant 3 and merchant offering Option 4 from Merchant 4 may be displayed.

In some examples, machine learning techniques may be utilized to identify the merchant offerings. For example, a machine learning model 138 may be generated and configured to utilize, as input, some or all of the interaction data as well as the results from the image processing component 142. The machine learning model 138 may be trained utilizing a training dataset that indicates prior results of the machine learning model 138 and feedback data indicating the accuracy or desirability of the results. A machine-trained model 138 may be generated using the training dataset, and the machine-trained model 138 may be utilized to identify the candidate merchant offerings that correspond to the items in the list of items. In these examples, a number of factors determined to be relevant by the machine-trained model 138 may be utilized to determine which of several candidate merchant offerings is most likely to correspond to the item at issue as written by the user as well as which merchant the user is most likely to desire to make the purchase from. Additional details on the use of machine learning techniques to determine items and merchants is described with respect to FIG. 9.

In examples where such additional interaction data is not available, the item identification component 144 may be configured to utilize the results of the image processing component 142 to perform an internet search or a search in a datastore 130 associated with the payment service 104 to determine one or more merchant offerings that may correspond to the individual items in the list of items. In such an example, the item(s) identified in the list can be used in a search query to identify one or more merchant offerings that correspond to the item(s). In some examples, the item identification component 144 may process or filter the results, for example based on relevance or other factors as described above.

In addition to the above, the item identification component 144 may be configured to determine a recipient for one or more of the items in the list of items (e.g., who individual items are being purchased for). In some examples, such a determination can be based on context data. Context data can include text message conversations, social media interactions, sources of lists, data included on the list (e.g., explicit indications of the recipient for some or all of the items, indications of entities associated with a source (e.g., a particular teacher's school supply list), a letterhead indicating a source, a stationary indicating a source, etc.), timing, date, location, historical transaction data, and so on. The item identification component 144 may be configured to determine, in some examples, utilizing natural language understanding or computer vision techniques, the identifier of the recipient and to associate one or more of the items with the recipient. Once one or more recipients are determined, the item identification component 144 may utilize identifiers of the recipients to determine the merchant offerings to present. For example, if prior transactions indicate that certain merchants are utilized to acquire items for a given recipient, this information may be utilized to inform which merchant offering to display to the user for purchase of the item(s) at issue. In other examples where the recipient is also a user of the payment service 104, prior interactions by that recipient with the payment service 104 may be leveraged to determine where the recipient usually shops and thus which merchants should be presented to the user. That is, when a particular recipient is identified, the item identification component 144 can personalize the merchant offerings for that particular recipient. As such, in some examples, a single list of items can include merchant offerings customized for different recipients.

In addition to the above, the payment service 104 may be configured to allow for additional functionality to be presented to the user in association with the determined list of items. For example, the price tracking component 146 may be configured to present price tracking options for the user 101 to select from. In a nonlimiting example, once the items are identified and associated merchant offerings determined, indicators of the merchant offerings, an identifier of the item, and identifiers of the merchants from which the item can be purchased may be displayed via a user interface 120 on the user device 102. In some examples, the user 101 may provide user input selecting a given merchant or merchant offering and may indicate an intent to purchase the item at that time. However, in other examples, a price tracking option may be displayed and may allow a user 101 to provide user input indicating a price (that is less than the current price of the item) that the user 101 would be willing to purchase the item, such as when the item goes on sale. In this example, the price tracking component 146 may be configured to receive the user input and to store data representing the user-defined price and the item. The price tracking component 146 may periodically or otherwise determine when the price of the item changes, and if the price of the item satisfies the price threshold set by the user 101, the payment component 136 may automatically purchase the item on behalf of the user 101, or in other examples may send a notification to the user device 02 requesting confirmation that the purchase should be made. While user-defined price is utilized herein as an example of user input received that indicates a condition to be satisfied prior to purchase of the item(s), any user-defined condition may be applied. Examples of such user-defined conditions may include a particular item being made available by the merchant in question, a particular size of the item being made available, a particular color of the item being made available, a particular merchant offering the item for sale, etc. That is, in some examples, the payment service 104 can configure conditions, automatically or based on user input, that when satisfied can trigger an auto-completion, truncated, or simplified process for completion of a transaction. For example, the price tracking component 146 may be configured to present price tracking options for the user to select from. In a nonlimiting example, a user list may include Item 1 and Item 2. Once the items are identified and associated merchant offerings determined, indicators of the merchant offerings, an identifier of the item, and identifiers of the merchants from which the item can be purchased may be displayed via a user interface 120 on the user device 102. In some examples, the user may provide user input selecting a given merchant or merchant offering and may indicate an intent to purchase the item at that time. However, in other examples, a price tracking option may be displayed and may allow a user to provide user input indicating a price (that is less than the current price of the item) that the user would be willing to purchase the item for, such as when the item goes on sale. In this example, the price tracking component 146 may be configured to receive the user input and to store data representing the user-defined price and the item. The price tracking component 146 may periodically or otherwise determine when the price of the item changes, and if the price of the item satisfies the price threshold set by the user, the payment component 136 may automatically purchase the item on behalf of the user, or in other examples may send a notification to the user requesting confirmation that the purchase should be made.

Additionally, in examples, when a user 101 provides user input indicating that a purchase one or more of the items on the list of items should be made, the user 101 may be presented with multiple payment options. While any payment options may be presented, some example payment options may enable payment for the entire purchase at the time of the transaction by a stored balance account, a credit card, a debit card (which may be linked to the stored balance account or another bank account), a loan option, etc. As described in more detail herein, the payment installment plans may provide different options for an installment frequency or a total amount of time over which installments on the installment plans may be made. For example, a given installment plan may be to make four installments over a six-week period of time, or six installments over a two-month period of time, or ten installments over a four-month period of time, etc. A user interface 120 may be presented on the user device 102 with options for the user 101 to select the desired installment plan for any given item in the list of items or an aggregation of the items. By so doing, the user 101 may customize how they pay for multiple items on the list over time.

In examples, the user interfaces 120 described herein may be described as displaying functionality to allow for user interaction. That functionality may be provided utilizing one or more interactive elements. The interactive element component 132 may generate these interactive elements that may be configured to be shared and displayed in the payment application 122 and outside of the payment application 122, such as on one or more social media applications, email applications, messaging applications, merchant applications, etc. The interactive element can correspond to a link, a deep link, a bar code, a QR code, or any other element that is capable of interaction. In some examples, the interactive element can have data embedded therein to trigger certain functionality, such as the display of information, initiation of a transaction, navigation to another application or ecommerce website, etc. The functionality may be particularly robust and may update on-the-fly to provide users with real-time information about the transaction at issue. In some examples, the interactive element may be shareable such that multiple users may utilize the interactive element to initiate purchase of an item. Additionally, it should be understood that the interactive element associated with a merchant offering may be utilized for a "one-click" checkout process. In other words, if a user selects the interactive element, the payment service 104 may utilize the data embedded in the interactive element to associate the merchant offering with a "cart," acquire payment information, and place an order for the item.

In addition to the above, some lists of items may include "sub-lists." The image processing techniques described herein may be utilized to identify a situation when the list in question includes sub-lists and may group the list into the sub-lists for purposes of determining the items from the list and determining candidate merchant offerings to recommend. In some examples, the sub-lists may be prioritized based at least in part on a category associated with a given sub-list, a time of day, a day of the week/month/year, user-indicated preferences, determinations made based on prior user interactions with the payment service 104, etc. In an example, the list may include a sub-list for Christmas, a sub-list for a birthday, a sub-list for Thanksgiving, etc. If calendar data indicates that the data of the year is closer to Christmas than the other events, the Christmas sub-list may be prioritized, for example. The user interfaces 120 may be utilized to allow the user to provide input data to organize, sort, or manage the sub-lists and items associated therewith.

In some implementations, the methods and systems described herein can be integrated with voice services (e.g. Amazon's ALEXA®, Apple's SIRI®, or Microsoft's CORTANA®) through specific API calls to such services. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein.

Figure 2:
FIG. 2 is an example user interface displayed on an example user device, where the user interface is configured to present recognized text from a list of items and corresponding merchant offerings, according to an embodiment described herein.

FIG. 2 is an example user interface 200 displayed on an example user device 102, where the user interface 200 is configured to present recognized text from a list of items and corresponding merchant offerings, according to an embodiment described herein. The user interface 200 may be the same or similar to one or more of the user interfaces 120 described with respect to FIG. 1.

As shown in FIG. 2, at step 202, user device 102 may be configured to capture an image of a physical list of items 208. In the example of FIG. 2, a first handwritten item 210(*a*) and a second handwritten item 212(*b*) are shown on the physical list of items 208. The first handwritten item 210(*a*) is for "Item 1" written in cursive English. The second handwritten item 210(*b*) is for "Item 2" written in cursive English. It should be understood that the physical list of items 208 may include any representation of a given item, including text, a drawing, or a combination thereof, and may be in any language and written in any way. The user of the user device 102 may enable a payment application and utilize a camera of the user device 102 to capture an image of the physical list of items 208. The image may include the physical list of items 208, a background, other objects in the field of view of the camera, etc.

At step 204, the user interface 200 may be caused to display a textual representation 212(*a*), 212(*b*) of the items in the physical list of items 208. As shown in FIG. 2, the textual representation 212(*a*) of "Item 1" from the physical list of items 208 may be displayed, and the textual representation 212(*b*) of "Item 2" from the physical list of items 208 may be displayed. Additional details on how an image processing component of the payment service described herein may be utilized to generate the textual representations 212(*a*), 212(*b*) are provided with respect to FIG. 1 and FIG. 6. By displaying the textual representations 212(*a*), 212(*b*) on the user interface 200, the user may provide user input data indicating whether the textual representations 212(*a*), 212(*b*) accurately reflect the items in the handwritten list. In examples where the user input data indicates that one or more of the textual representations 212(*a*), 212(*b*) are not accurate, the user interface 200 may display functionality that may allow the user to correct the inaccuracy.

At step 206, the user interface 200 may display merchant offerings 214(*a*)-(*d*) as well as information associated with the merchant offerings 214(*a*)-(*d*). The user interface 200 may also display item identifiers 216(*a*), 216(*b*), as well as merchant identifiers 218(*a*)-(*d*). The item identifiers 216(*a*), 216(*b*) may provide a visual indication of the items that were identified and displayed at step 204. Additionally, for individual ones of the item identifiers 216(*a*), 216(*b*), the merchant offerings 214(*a*)-(*d*) may be displayed. As shown in FIG. 2, "Item 1" may be determined to be associated with one or more offerings, including, in the example of FIG. 2, Option 1 214(*a*) from Merchant 1 218(*a*), Option 2 214(*b*) from Merchant 2 218(*b*), Option 3 214(*c*) from Merchant 3 218(*c*), and Option 4 from Merchant 4 218(*d*). In this example, multiple merchant offerings are associated with each item in the list of items. By displaying this information for the user, the user may be able to select which of the offerings the user would like to proceed with. The merchant offerings 214(*a*)-(*d*) may include identifying information about the items associated with those merchant offerings 214(*a*)-(*d*), including images, text, and item details such as sizes, types, colors, etc. The merchant offerings 214(*a*)-(*d*) may be interactive elements that, when selected, cause additional or different information to be displayed for the particular merchant offering 214(*a*)-(*d*).

As shown in FIG. 2, user input is received associated with selection of one or more merchant offering options. However, in other examples, the user may provide input to capture an image of the list of items and the payment service or user device described herein may automatically perform the operation(s) of identifying the items, identifying the merchant offerings, generating a cart or other channel that includes the merchant offerings, auto-populating payment information, and otherwise performing operations to purchase the items. The user may then simply provide user input requesting to confirm the purchase and the payment component of the payment service may facilitate the transaction.

Figure 3:
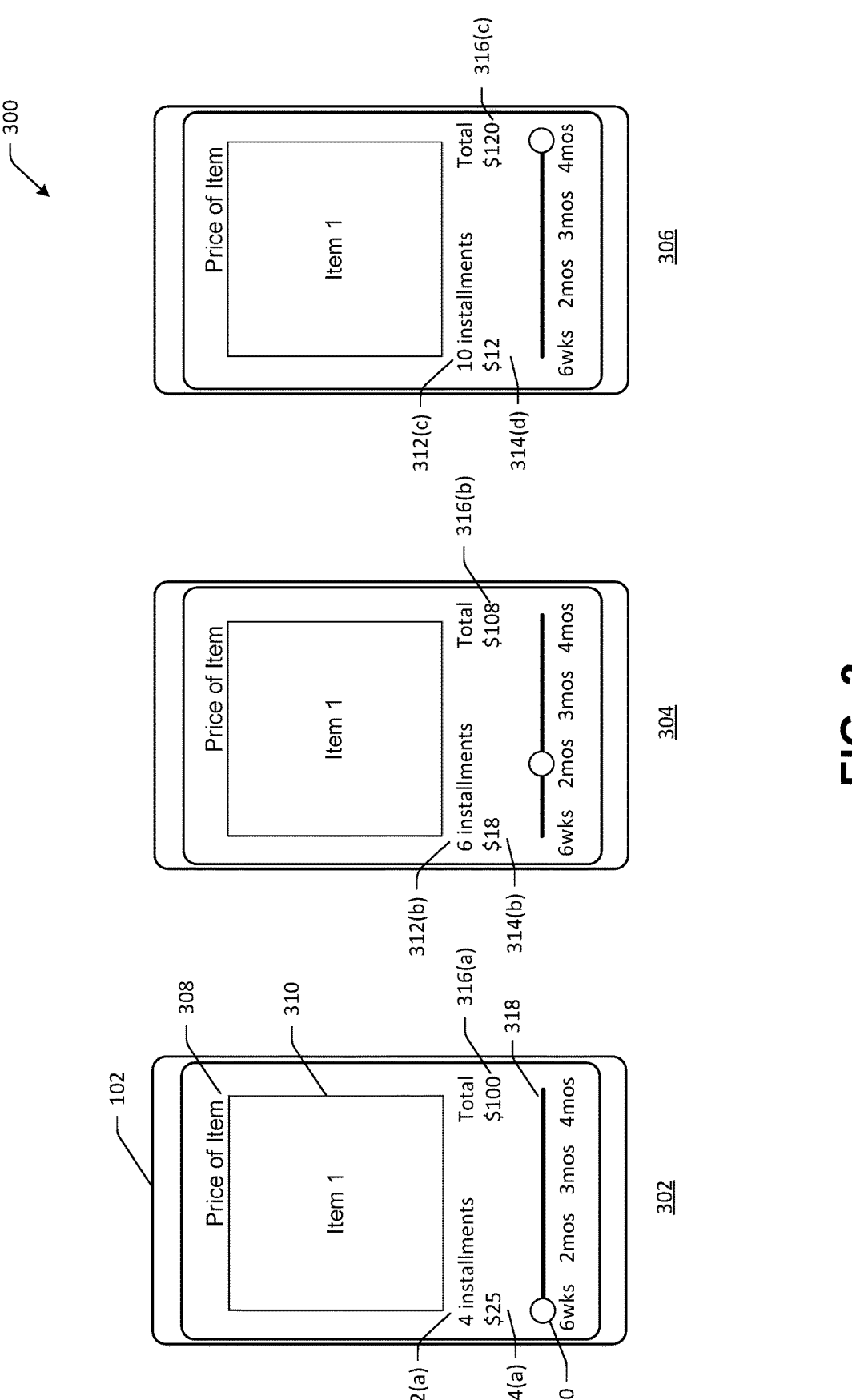
FIG. 3 is an example user interface displayed on an example user device, where the user interface is configured to present installment plan options, according to an embodiment described herein.

FIG. 3 is an example user interface 300 displayed on an example user device 102, where the user interface 300 is configured to present installment plan options, according to an embodiment described herein. The user interface 300 may be the same or similar to one or more of the user interfaces 120 described with respect to FIG. 1.

As shown in FIG. 3, at step 302, the user interface 300 may display functionality to allow for the selection of one or more payment installment plans to be utilized to satisfy a cost of a transaction for one or more items in the list of items as described herein. The user interface 300 may include an advertised price 308 of the item(s) at issue as provided by the merchant that is selling the item. In an example, and as illustrated, the advertised price 308 may remain constant even as different installment plans are reviewed and chosen. The user interface 300 may also include item information 310, which may include text or images of the item(s) at issue. Here, again, the item information 310 may remain constant even as different installment plans are reviewed and chosen.

The user interface 300 may also include installment number indicators 312(*a*)-(*c*), which may indicate, for various installment plan options, the number of installments for those options. As shown in FIG. 3, at step 302 the installment number indicator 312(*a*) indicates the installment plan at issue has "4" installments, at step 304 the installment number indicator 312(*b*) indicates the installment plan at issue has "6" installments, and at step 306 the installment number indicator 312(*c*) indicates the installment plan at issue has "10" installments. Additionally, the user interface 300 may indicate a per-installment amount 314(*a*)-(*c*) associated with the various installment plan options. As shown in FIG. 3, at step 302, the per-installment amount 314(*a*) indicates the installment plan at issue would require a per-installment payment of $25 over four installments, at step 304 the per-installment amount 314(*b*) indicates the installment plan at issue would require a per-installment payment of $18 over six installments, and at step 306 the per-installment amount 314(*c*) indicates the installment plan at issue would require a per-installment payment of $12 over ten installments. Additionally, a total price 316(*a*)-(*c*) may also be displayed that indicates a total cost of the installment plan, if implemented. At step 302, if selected, the installment plan would require only four installments with each at a higher amount than the other options displayed in FIG. 3. In this example, the total price 316(*a*) for this installment plan would be $100. At step 304, if selected, the installment plan would require six installments with each at a lower amount than the option at step 302. In this example, given that the funds for payment of the item would not be received until later than if the installment plan at step 302 were chosen, the total price 316(*b*) may be more than the total price 316(*a*) from step 302. In the example of step 304, the six-installment plan may require a per-installment amount 314(*b*) of $18 and a total price 316(*b*) of $108. A similar process may be performed with respect to step 306, where the total price 316(*c*) may be for $120 given that ten installments will be made.

In addition to the above, the user interface 300 may include an interactive element 318, which may present options for an amount of time over which installments will be made to satisfy a cost of the transaction. The interactive element 318 in FIG. 3 shows options ranging from six weeks to four months. It should be understood, however, that the interactive element 318 may include any period(s) of time. The user interface 300 may also include a slider element 320, which may be manipulated by the user to select an amount of time on the interactive element 318. As shown in FIG. 3, the shorter the amount of time that is selected, the less expensive the total price 316(*a*)-(*c*) will be and the fewer installments there will be. The longer the amount of time that is selected, the more expensive the total price 316(*a*)-(*c*) will be and the more installments there will be.

With respect to the installment plans described herein, the installment plans may be considered loans where the payment service 104 provides the entire purchase price for the item(s) at issue to the merchant(s) at issue, effectively loaning or otherwise advancing funds to the user. In exchange for not needing to provide the total purchase price, the user agrees to pay the purchase price over the course of multiple installments. In some examples, the first installment is paid at the outset with one or more other installments paid at intervals thereafter. Generally, a fee for participating in such an installment plan is also added to the total cost of the transaction. In some examples, the user pays that fee either up front or as part of some or all of the installments in the installment plan. In some examples, the merchant or payment service can pay the fees. These fees may be static or determined dynamically based at least in part on one or more factors, such as number of installments, total purchase price, the user at issue, merchant at issue, item(s) being purchased, etc. Generally, an installment plan with more installments over a larger period of time may lead to increased fees as compared to an installment plan with less installments over a shorter period of time. For these installment plans, a stored balance account of the payment service 104 may have the purchase price withdrawn and deposited into an account of the merchant. Thereafter, a stored balance account of the user may be used to withdraw an amount associated with each installment and deposited into the payment service 104 stored balance account as reimbursement.

FIG. 4 is an example user interface 400 displayed on an example user device 102, where the user interface 400 is configured to present price tracking functionality, according to an embodiment described herein. The user interface 400 may be the same or similar to one or more of the user interfaces 120 described with respect to FIG. 1.

As shown in FIG. 4, the user interface 400 may include some of the same elements as described with respect to FIG. 2, including one or more item identifiers 216(*a*), 216(*b*), one or more merchant offerings 214(*a*)-(*d*), and one or more merchant identifiers 218(*a*)-(*d*). These elements may be displayed and utilized in the same or a similar manner as described with respect to FIG. 2, as described herein. Additionally, the user interface 400 may include current price indicators 402(*a*), 402(*b*), and price-to-purchase indicators 404(*a*), 404(*b*). The current price indicators 402(*a*), 402(*b*) may indicate a current price of the item at issue as advertised or otherwise made available by the merchant that has been selected. In the example of FIG. 4, the current price indicator 402(*a*) for Item 1 is $X, and the current price indicator 402(*b*) for Item 2 is $Z. In some examples, the user may provide input data requesting to purchase the items at issue for the prices indicated by the current price indicators 402(*a*), 402(*b*). In these examples, the user may provide user input indicating this intent and a payment component of the payment service may facilitate payment for the items. However, in other examples, the user may provide input requesting to wait to purchase one or more of the items until the price drops. As shown in FIG. 4, the price-to-purchase indicator 404(*a*) may be set by the user to $X-Y, indicating a price that is Y amount less than X. In this example, the payment service may monitor the price of Item 1 and facilitate purchase of Item 1 if and when the price drops to the threshold set by the user. However, the price-to-purchase indicator 404(*b*) may be set by the user to $Z, which is the current price of Item 2. In this example, the payment service may facilitate payment for the purchase of Item 2 at a current time, and wait until the price threshold for Item 1 is satisfied to facilitate purchase of that item.

Figure 5:
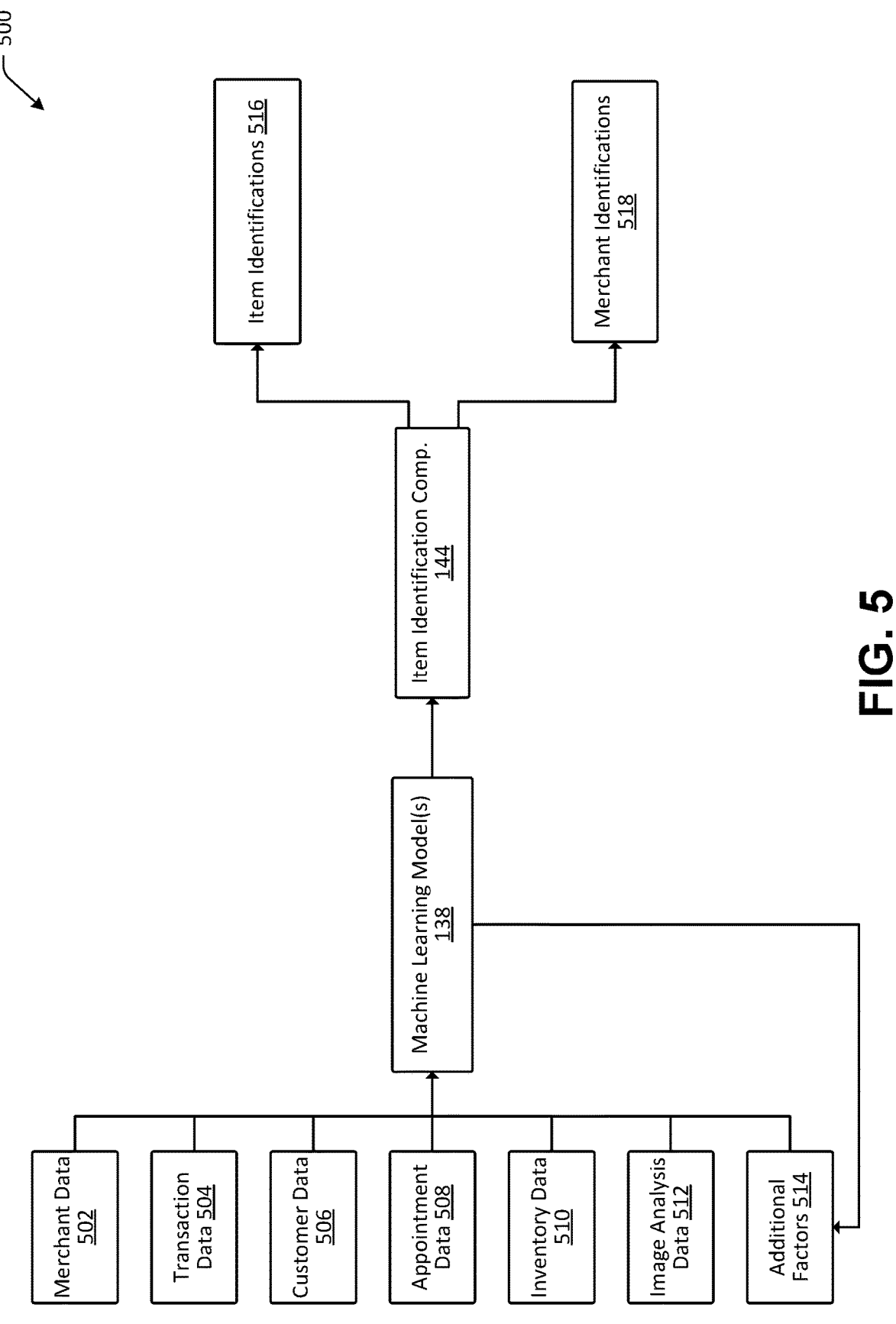
FIG. 5 is a conceptual diagram of example data and components utilized to identify items from a list of items and to identify merchants offering those items, according to an embodiment described herein.

FIG. 5 is a conceptual diagram of example data and components utilized to identify items from a list of items and to identify merchants offering those items, according to an embodiment described herein. The components of FIG. 5 may be the same or similar to the components described with respect to FIG. 1, above. For example, FIG. 5 may include one or more machine learning models 138 and an item identification component 144. Additionally, FIG. 5 may include one or more types of interaction data, such as merchant data 502, transaction data 504, customer data 506, appointment data 508, inventory data 510, image analysis data 512, and one or more additional factors 514.

The various types of interaction data described with respect to FIG. 5 may be utilized to determine item identifications 516 and merchant identifications 518 from image data representing a list of items. The item identifications 516 and/or merchant identifications 518 may be utilized to determine which of the candidate merchants offer the items at issue, and merchant offerings available from those merchants for the items at issue may be determined. For example, as described in more detail with respect to FIG. 1, an image processing component of a payment service may be configured to intake image data representing a list of items and generate text data or tagged data representing items as handwritten on the list of items. This text data or tagged data may correspond to the image analysis data 512 that is one of several types of interaction data that may be utilized to determine merchant offerings.

In addition to the above, the merchant data 502 may indicate merchants that are associated with the payment service as well as types of items that the merchants sell, locations of the merchants, etc. The transaction data 504 may indicate details associated with transactions processed or otherwise performed via the payment service, including previous merchants and/or customers involved in those transactions, items purchased in those transactions, characteristics or features of items purchased in those transactions, recency of various transactions, frequency of various transactions, payment methods of such transactions, etc. The customer data 506 may indicate transaction data particular to individual users (e.g., customers), one or more user preferences associated with the user, prior interactions by the user with the payment service or the payment application (including those interactions not necessarily tied to transactions), etc. The appointment data 508 may indicate availability of services that may correspond to the item(s) as well as availability of the user in question. The inventory data 510 may indicate availability of goods for sale by the various merchants.

Some or all of this interaction data may be parsed, processed, or otherwise formatted as input into the one or more machine learning models 138 described herein. For example, machine learning techniques may be utilized to identify the merchant offerings. A machine learning model 138 may be trained utilizing a training dataset that indicates prior results of the machine learning model 138 and feedback data indicating the accuracy or desirability of the results. A machine-trained model 138 may be generated using the training dataset, and the machine-trained model 138 may be utilized by the item identification component 144 to identify the candidate merchant offerings that correspond to the items in the list of items. In these examples, a number of factors determined to be relevant by the machine-trained model 138 may be utilized to determine which of several candidate merchant offerings is most likely to correspond to the item at issue as written by the user as well as which merchant the user is most likely to desire to make the purchase from. In some examples, this can be output as a relevance metric, a certainty metric, or another metric that can be used to rank or otherwise prioritize candidate merchant offerings. In other examples, instead of utilizing output of a machine-trained model, one or more predefined rules may be utilized to rank the candidate merchant offerings. The rules may be based at least in part on the data utilized by the machine-trained models, but instead of utilizing a modeling approach, a rules-based approach may be utilized to rank the candidate merchant offerings.

In some examples, the machine-trained model 138 may be able to utilize the merchant data 502 and the transaction data 504 to determine which merchant the user in question typically interacts with, or which merchants similarly situated users have interacted with, or which merchants are most likely to sell items that are desirable to the user or similarly situated users, or one or more other factors such as user preferences, price comparisons, a closest location to the user, fulfillment optimization factors, loyalty maximization factors, item availability, etc. The machine-trained model

138 may also be able to utilize the customer data 506 to determine similarly situated users, which of multiple possible items the handwritten item corresponds to, which items the user is most likely to purchase, etc. The inventory data 510 and appointment data 508 may be similarly utilized by the machine-trained model 138 to determine availability of the item(s) at issue, including with respect to a schedule associated with the user. Over time, the machine learning models 138 may determine one or more other factors 514 that impact identifying of items and merchants as described herein. These other factors 514 may be identified and data associated with those factors may be included in the analysis performed by the item identification component 144.

As described in more detail with respect to FIG. 1, in some examples, the merchant offering may match the item in question in whole. For example, the identified item may be "Brand A shoes" and the merchant offering may have an item description that is exactly "Brand A shoes." In these examples, the merchant offering may be identified as corresponding to the item in question. In other examples, determining which merchant offerings correspond to a given item may be based at least in part on a similarity score indicating a similarity of attributes of the item to attributes of merchant offerings. Such attributes may include textual descriptions of the items and offerings, images associated with the items and offerings, similarities between classifications of the items and classifications of the offerings or the merchants associated with the offerings, etc. In other examples, the item and the merchant offering(s) may not represent a one-to-one correlation, and in these examples the similarity score may be utilized. Such scores may be ranked and the most favorable one or more merchant offerings may be selected or presented to the user for selection. As described above, interaction data may be utilized to personalize or otherwise customize the selection of merchant offerings, such as by selecting merchants that a given user has transacted with in the past, selecting item categories the users has selected in the past, etc. As described earlier with respect to FIG. 5, machine learning techniques may be utilized to determine how such interaction data may be utilized by machine learning models to determine merchant offerings.

FIGS. 6-9 are example processes for image-based analysis for intelligent item identification and utilization. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-5 and 10-14, although the processes may be implemented in a wide variety of other environments, architectures and systems.

Figure 6:
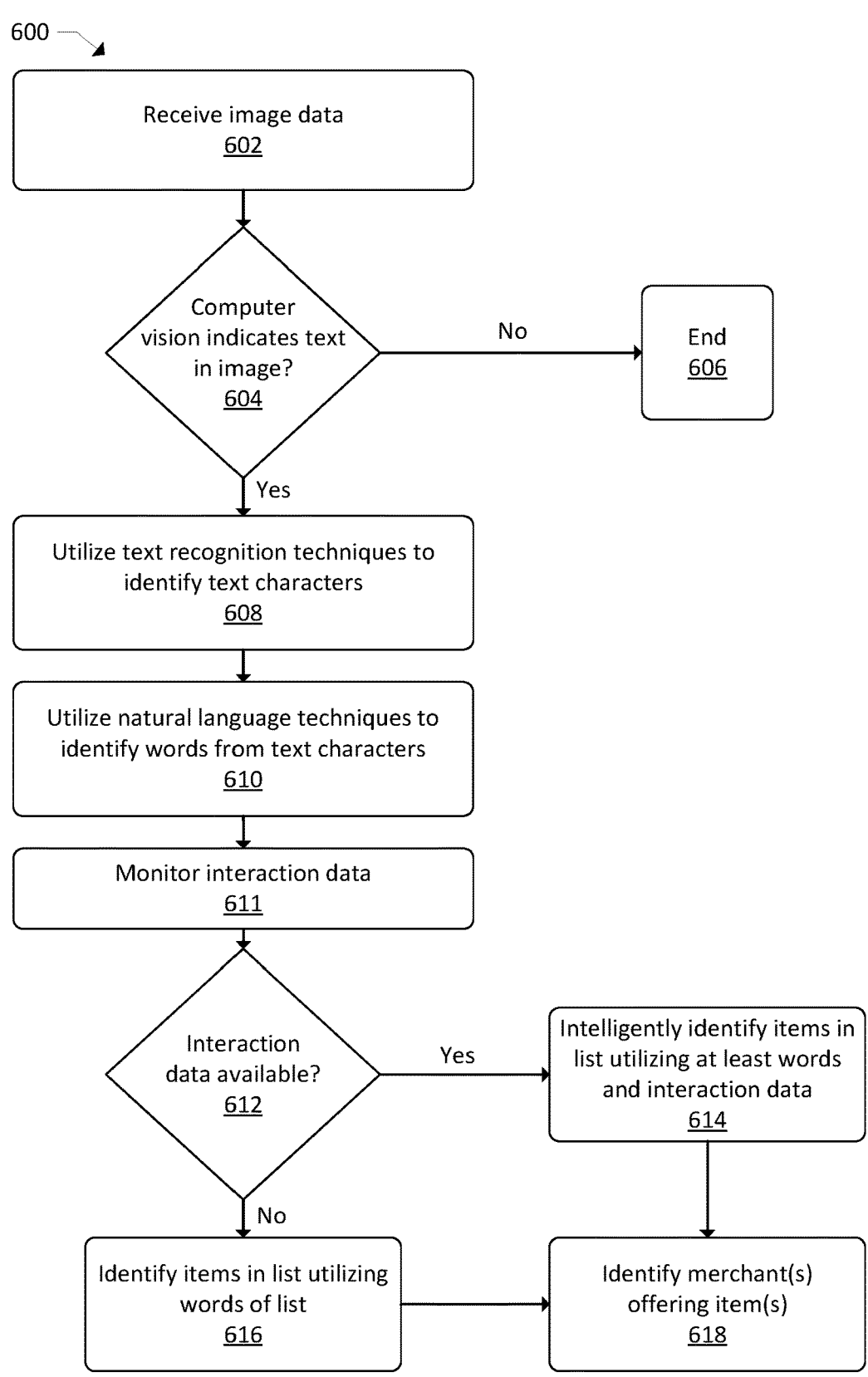
FIG. 6 is a flow diagram of an example process for identifying items and merchants from a physical list of items, according to an embodiment described herein.

FIG. 6 is a flow diagram of an example process 600 for identifying items and merchants from a physical list of items, according to an embodiment described herein. The order in which the operations or steps are described is not intended to be construed as a limitation, and any number of the described operations may be combined in any order and/or in parallel to implement process 600.

At block 602, the process 600 may include receiving image data. For example, image data corresponding to the image may be generated at a user device and that image data may be sent to a payment service associated with the payment application. The payment service may receive the image data and may initiate a process for identifying individual items from the text and for identifying merchant offerings that correspond to the individual items.

At block 604, the process 600 may include determining whether computer vision processing on the image data indicates that text has been identified in the image data. For example, computer vision techniques may initially be utilized to identify a portion of the image data that corresponds to words. Additional details on the user of computer vision are provided with respect to FIG. 1, but in general an image processing component of the payment service may be configured to recognize various objects in the image data and to label those objects. In an example, an image processing component may be configured to label a portion of the image data corresponding to words, another portion correspond to a background, or other portions that do not necessarily include words.

In examples where the computer vision processing does not indicate that text has been identified, the process 600 may end at block 606. In this example, the image data sent to the payment service may not include text portions that may be utilized to identify the handwritten items, and thus continued processing of the image data may not be possible. In other examples, if user input indicates that the purpose of the image data was to take a photograph of the list of items, the computer vision processing may indicate that text was not identified to a threshold degree of confidence. In this example, a prompt may be sent to the user device requesting that another image of the list of items be taken.

In examples where the computer vision processing indicates that text has been identified, the process 600 may include, at block 608, utilizing text recognition techniques to identify text characters from the portion of the image data identified as containing text. For example, the portion of the image data that corresponds to words may be further analyzed by the image processing component to identify text characters of the words. For example, optical character recognition or other text processing functionality may be utilized to determine individual text characters of the words. By so doing, a handwritten list of items, which may be in various handwritten forms given the variance in writing abilities, styles, etc. of users, may be converted into text data representing individual text characters.

At block 610, the process 600 may include utilizing natural language understanding techniques to identify words from the text characters. For example, the image processing component may utilize, in examples, natural language processing techniques to determine what the words are from the text data. Utilizing a specific but non-limiting example, a handwritten list of items may include a "New Brand A sneaker" item. Once the portion of the image data corresponding to these words is determined, the optical character recognition processing may be utilized to generate text characters, which depending on the clarity of the handwriting, may be determined to be "newbrandasneaker," or some other representation that does not necessarily yet represent words. The natural language processing may be utilized to identify words from the string of text characters, thereby converting "newbrandasneaker" to "new" "brand a" "sneaker."

At block 611, the process 600 may include monitoring interaction data, which may be performed in real time or near real time. For example, in some situations interaction data may be generated on-the-fly based at least in part on user interactions during the transaction at issue. For example, user input data may be received when the image of the list of items is captured, when the identified items from the list are displayed on a user interface, when merchant offering options are displayed on the user interface, etc. This interaction data may be generated on-the-fly and utilized as described below.

At block 612, the process 600 may include determining whether interaction data is available. For example, once the one or more item names on the item list have been determined by the image processing component, an item identification component may be configured to take the results from the image processing component and determine an actual merchant offering that corresponds to the item(s) on the list of items. To do so, in some examples, additional data such as interaction data may not be available. Such interaction data may include, for example, merchant data, transaction data, customer data, appointment data, inventory data, or other types of data or factors such as those determined to be relevant by machine learning models as described more fully herein.

In examples where interaction data is available, the process 600 may include, at block 614, intelligently identifying the item(s) from the list of items utilizing at least the interaction data and the words identified at block 610. For example, one or more types of the interaction data may be available and may be utilized to determine the merchant offerings. For example, the merchant data may indicate merchants that are associated with the payment service as well as types of items that the merchants sell, locations of the merchants, etc. The transaction data may indicate details about prior transactions with the user at issue, including previous merchants involved in those transactions, items purchased in those transactions, recency of various transactions, etc. The customer data may indicate one or more user preferences associated with the user, prior interactions by the user with the payment service or the payment application (including those interactions not necessarily tied to transactions), etc. The appointment data may indicate availability of services that may correspond to the item(s) as well as availability of the user in question. The inventory data may indicate availability of goods for sale by the various merchants. The item identification component may be configured to utilize some or all of this data to identify candidate merchant offerings that correspond to the individual items on the list of items.

In some examples, machine learning techniques may be utilized to identify the merchant offerings. For example, a machine learning model may be generated and configured to utilize, as input, some or all of the interaction data as well as the results from the image processing component. The machine learning model may be trained utilizing a training dataset that indicates prior results of the machine learning model and feedback data indicating the accuracy or desirability of the results. A machine-trained model may be generated using the training dataset, and the machine-trained model may be utilized to identify the candidate merchant offerings that correspond to the items in the list of items. In these examples, a number of factors determined to be relevant by the machine-trained model may be utilized to determine which of several candidate merchant offerings is most likely to correspond to the item at issue as written by the user as well as which merchant the user is most likely to desire to make the purchase from. Additional details on the use of machine learning techniques to determine items and merchants is described elsewhere herein.

In examples where interaction data is not available, the process 600 may include, at block 616, identifying the item(s) from the list of items utilizing the words identified at block 608 and without the interaction data. For example, where such data is not available, the item identification component may be configured to utilize the results of the image processing component to perform an internet search or a search in a database associated with the payment service to determine one or more merchant offerings that may correspond to the individual items in the list of items.

At block 618, which may proceed from block 614 or block 616, the process 600 may include identifying one or more merchants offering the item(s). For example, as described above, the one or more items may be identified, and then the payment service may determine which merchants offer those items for sale. The interaction data and the machine-trained models described herein may be utilized to determine which of those merchants should be presented to the user as merchant offering options for the item(s) at issue.

It should be understood that the merchant offerings described herein may be identified from the words of the items on the list of items, from phrases including the words, or from representations of the words such as symbols or otherwise. Additionally, the candidate merchant offerings may be ranked or selected utilizing a rules-based approach with predefined rules instead of or in addition to utilizing a machine-trained model.

Figure 7:
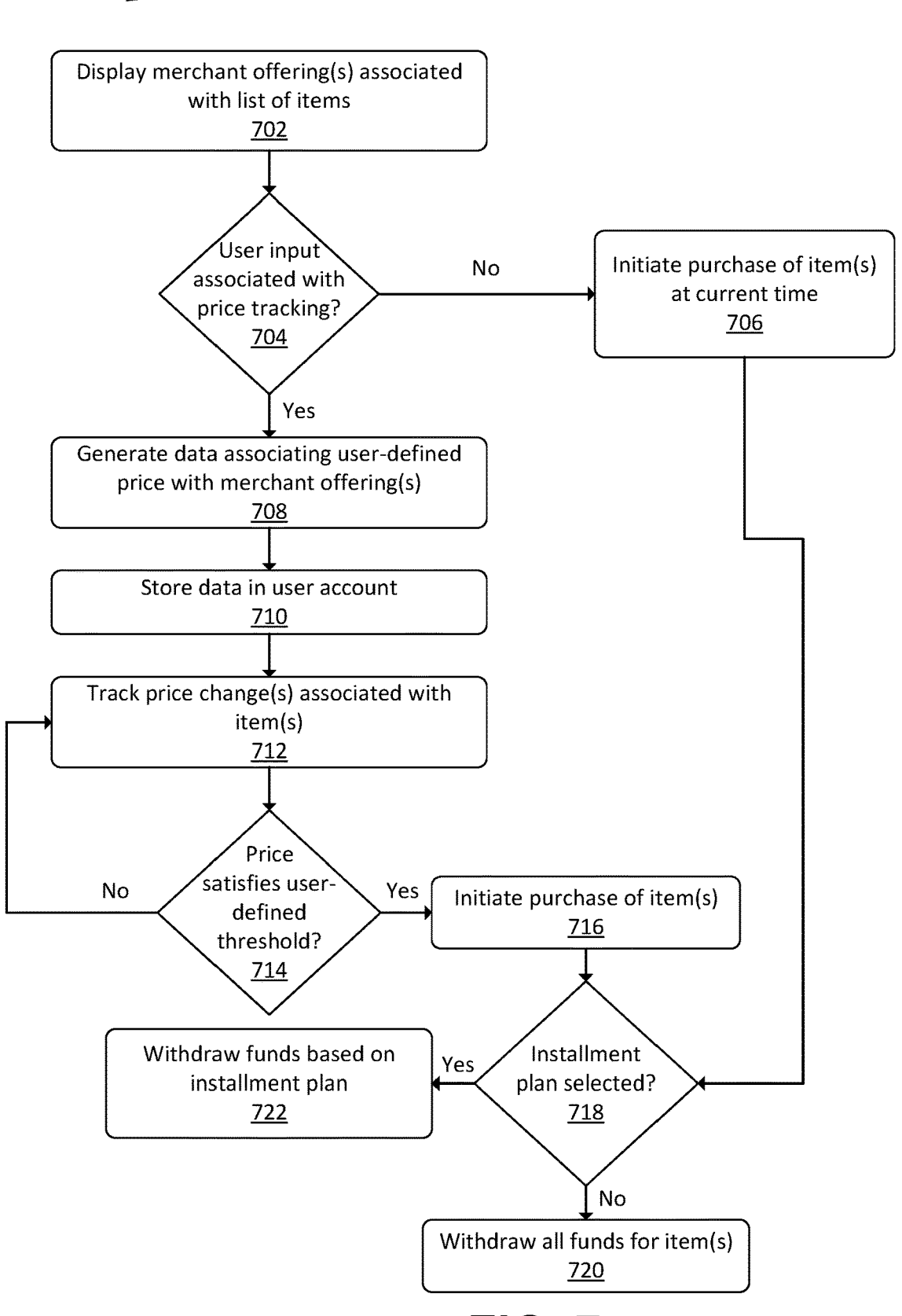
FIG. 7 is a flow diagram of an example process for performing price tracking functionality in association with installment plans, according to an embodiment described herein.

FIG. 7 is a flow diagram of an example process 700 for performing price tracking functionality in association with installment plans, according to an embodiment described herein. The order in which the operations or steps are described is not intended to be construed as a limitation, and any number of the described operations may be combined in any order and/or in parallel to implement process 700.

At block 702, the process 700 may include displaying one or more merchant offerings associated with a list of items. For example, as described above, one or more items may be identified from image data depicting a list of items, and then the payment service may determine which merchants offer those items for sale. The interaction data and the machine-trained models described herein may be utilized to determine which of those merchants should be presented to the user as merchant offering options for the item(s) at issue.

At block 704, the process 700 may include determining whether user input associated with price tracking has been received. For example, a price tracking component may be configured to present price tracking options for the user to select from. In a nonlimiting example, a user list may include Item 1 and Item 2. Once the items are identified and associated merchant offerings determined, indicators of the merchant offerings, the identifiers of the item at issue, and identifiers of the merchants from which the item can be purchased may be displayed via a user interface on the user device. In some examples, the user may provide user input selecting a given merchant or merchant offering and may indicate an intent to purchase the item at that time. However, in other examples, a price tracking option may be displayed and may allow a user to provide user input indicating a price (that is less than the current price of the item) that the user would be willing to purchase the item, such as when the item goes on sale.

In examples where user input associated with price tracking has not been received, the process 700 may include, at block 706, initiating a purchase of the item(s) at a current time. For example, having determined the merchant offering to associate with the transaction and having determined that price tracking functionality has not been enabled by the user, a payment component of the payment service may initiate a process of paying for the item(s) at issue utilizing one or more payment options provided to the user.

In examples where user input associated with price tracking has been received, the process 700 may include, at block 708, generating data that associates a user-defined price with the merchant offering(s). For example, the data may indicate the user-defined price, an identifier of the item at issue, an identifier of the merchant that was selected, etc. In some examples, user preference data may also be generated indicating whether the user-defined price is flexible, whether notifications of price changes are enabled, whether substituting merchants is acceptable to the merchant, etc.

At block 710, the process 700 may include storing the data in a user account of the user. For example, the user account may indicate information such as customer data, transaction data, etc. The user account may also be caused to store the data that associates the user-defined price with the item(s) at issue. This data may be called by a price tracking component of the payment service to determine whether user-defined price threshold(s) have been satisfied as described below.

As an alternative to the process described at block 710 and the remainder of the process 700 described with respect to FIG. 7, the payment service may facilitate a purchase for the item(s) at issue when the user input regarding price tracking is received. In this example, a stored balance account of the payment service may be utilized to withdraw funds to satisfy a cost of the item(s), and the payment service may seek reimbursement from a stored balance account of the user at some point between when the transaction occurs and when the pricing data indicates the item(s) have reached the desired price. To do so, the payment service may withdraw funds in an amount of the user-indicated price and may attempt to receive a reimbursement from the merchant for the difference. In other examples, the payment service may engage in negotiations with the merchant to reduce the price to the user-indicated price.

At block 712, the process 700 may include tracking price change(s) associated with the item(s) that price tracking was initiated on. For example, the price tracking component may periodically or otherwise query one or more databases associated with the item(s) to determine whether a price change has occurred with respect to the item(s). While in this example the price tracking component may call the one or more databases for information on price changes, it should be understood that the price tracking component may receive push notification of the price changes as well, or alternatively.

At block 714, the process 700 may include determining whether the price as tracked satisfies the user-defined threshold. For example, the price change data may be received, and the user account where the price tracking data is stored may be queried for the user-defined price threshold. The price tracking component may compare the price change data with the user-defined price threshold to determine whether the price as tracked satisfies that user-defined threshold.

In examples where the price does not satisfy the user-defined threshold, the process 700 may return to block 712 where the price change(s) of the item may continue to be tracked. In this example, the price may not have dropped to a level that is desired by the user to move forward with the transaction. As such, the price tracking component may continue to track price changes to determine if and when the price of the item at issue drops to at least the user-defined price threshold.

In examples where the price satisfies the user-defined threshold, the process 700 may include, at block 716, initiating a purchase for the item(s) at the time when the price satisfies the user-defined threshold. Initiating the purchase for the item(s) may be performed in the same or a similar manner as described with respect to block 706, save that this operation may be performed when the price satisfies the user-defined threshold.

At block 718, which may proceed from block 716 or block 706 as described above, the process 700 may include determining whether an installment plan was selected to satisfy a cost of the item(s). For example, when a user expresses an intent to purchase one or more of the items on the list of items, the user may be presented with multiple payment options. One of the options may be to pay the entire purchase price for the item at the time of the transaction. However, in other examples, payment installment plan options may be presented to the user. As described in more detail herein, the payment installment plans may provide different options for an installment frequency or a total amount of time over which installments on the installment plans may be made. For example, a given installment plan may be to make four installments over a six week period of time, or six installments over a two month period of time, or ten installments over a four month period of time, etc. A user interface may be presented on the user device with options for the user to select the desired installment plan for any given item in the list of items or an aggregation of the items. By so doing, the user may provide input to customize how they pay for multiple items on the list over time.

In examples where an installment plan was not selected, the process 700 may include, at block 720, withdrawing all funds for the cost of the item(s) from the user account. In this example, the user has provided user input indicating an intent to pay for the cost of the item(s) at the time of purchase, and thus all of the funds needed to satisfy the cost of the item(s) may be withdrawn from a user account of the user and deposited into a merchant account of the merchant associated with the transaction. In some examples, the user may opt to use credit or another lending mechanism in which funds may not be withdrawn from an account of the user but from an account of the payment service (and later repaid by the user).

In examples where an installment plan was selected, the process 700 may include, at block 722, withdrawing funds for the cost of the item(s) pursuant to the installment plan. For example, a first payment on the installment plan may be made at the time of the initial transaction. Thereafter, when scheduled pursuant to the installment plan, the user account associated with the user may be queried and funds to satisfy a cost of the installment at issue may be withdrawn from the user account and deposited into the merchant account. This process may continue until all of the installments in the installment plan are paid utilizing funds from the user account.

FIG. 8 is a flow diagram of an example process 800 for image-based analysis for intelligent item identification and utilization. The order in which the operations or steps are described is not intended to be construed as a limitation, and any number of the described operations may be combined in any order and/or in parallel to implement process 800.

At block 802, the process 800 may include receiving image data corresponding to an image of a list of items. For example, image data corresponding to the image may be generated at a user device and that image data may be sent to a payment service associated with the payment application. The payment service may receive the image data and may initiate a process for identifying individual items from the text and for identifying merchant offerings that correspond to the individual items. As described above, techniques described herein are related to digitizing a list of items. The conversion from physical list of items to a digitized list of items can be done using a camera or other sensor, as described herein, to generate image data or other data representative of the physical list of items. As such, block 802 represents a first operation in such digitization.

At block 804, the process 800 may include determining, from the image data, a first item and a second item of the list of items. For example, computer vision techniques may initially be utilized to identify a portion of the image data that corresponds to words. Additional details on the user of computer vision are provided with respect to FIG. 1, but in general an image processing component of the payment service may be configured to recognize various objects in the image data and to label those objects. In an example, an image processing component may be configured to label a portion of the image data corresponding to words, another portion correspond to a background, or other portions that do not necessarily include words. In some examples, the image data sent to the payment service may not include text portions that may be utilized to identify the handwritten items, and thus continued processing of the image data may not be possible. In other examples, if user input indicates that the purpose of the image data was to take a photograph of the list of items, the computer vision processing may indicate that text was not identified to a threshold degree of confidence. In this example, a prompt may be sent to the user device requesting that another image of the list of items be taken. Then, the system may utilize text recognition techniques to identify text characters from the portion of the image data identified as containing text. For example, the portion of the image data that corresponds to words may be further analyzed by the image processing component to identify text characters of the words. For example, optical character recognition or other text processing functionality may be utilized to determine individual text characters of the words. By so doing, a handwritten list of items, which may be in various handwritten forms given the variance in writing abilities, styles, etc. of users, may be converted into text data representing individual text characters. Thereafter, the system may utilize natural language understanding techniques to identify words from the text characters. For example, the image processing component may utilize, in examples, natural language processing techniques to determine what the words are from the text data. Utilizing a specific but non-limiting example, a handwritten list of items may include a "New Brand A sneaker" item. Once the portion of the image data corresponding to these words is determined, the optical character recognition processing may be utilized to generate text characters, which depending on the clarity of the handwriting, may be determined to be "newbrandasneaker," or some other representation that does not necessarily yet represent words. The natural language processing may be utilized to identify words from the string of text characters, thereby converting "newbrandasneaker" to "new" "brand a" "sneaker."

As described above, the techniques described with respect to block 804 are grounded in computer vision, optical text recognition, and natural language processing techniques. Each of these individually could not be performed by a human, and the combination of these techniques to achieve the results described herein go far beyond what a human could hope to achieve. Indeed, absent the computer-centric solutions described herein, users would be constrained to a more typical purchasing experience where the user must individually search for each of several items on their list and individually purchase those items, potentially searching multiple merchants to find the desired item at the desired price with the desired purchasing options, etc.

At block 806, the process 800 may include determining, utilizing interaction data, a first merchant offering for the first item and a second merchant offering for the second item. For example, one or more types of the interaction data may be available and may be utilized to determine the merchant offerings. For example, the merchant data may indicate merchants that are associated with the payment service as well as types of items that the merchants sell, locations of the merchants, etc. The transaction data may indicate details about prior transactions with the user at issue, including previous merchants involved in those transactions, items purchased in those transactions, recency of various transactions, etc. The customer data may indicate one or more user preferences associated with the user, prior interactions by the user with the payment service or the payment application (including those interactions not necessarily tied to transactions), etc. The appointment data may indicate availability of services that may correspond to the item(s) as well as availability of the user in question. The inventory data may indicate availability of goods for sale by the various merchants. The item identification component may be configured to utilize some or all of this data to identify candidate merchant offerings that correspond to the individual items on the list of items.

In some examples, machine learning techniques may be utilized to identify the merchant offerings. For example, a machine learning model may be generated and configured to utilize, as input, some or all of the interaction data as well as the results from the image processing component. The machine learning model may be trained utilizing a training dataset that indicates prior results of the machine learning model and feedback data indicating the accuracy or desirability of the results. A machine-trained model may be generated using the training dataset, and the machine-trained model may be utilized to identify the candidate merchant offerings that correspond to the items in the list of items. In these examples, a number of factors determined to be relevant by the machine-trained model may be utilized to determine which of several candidate merchant offerings is most likely to correspond to the item at issue as written by the user as well as which merchant the user is most likely to desire to make the purchase from. Additional details on the use of machine learning techniques to determine items and merchants is described elsewhere herein.

As described above, the generation and training of machine learning models to, among other things, determine merchant offerings to correlate with identified items leads to a more accurate result than if machine learning were not used. The use of specifically trained machine learning models grounds the techniques described herein in a computer-centric environment and produces results that offer improvements over conventional technologies. These improvements include, for example, time sensitive identification items in a list of items, determinations on how interactive elements should be formatted for given users and given items, which merchant offerings to surface for the items in the list of items, selection of potential installment plan options, etc. The models may be trained again and again over time, each time learning new parameters or updating parameter weighting to make the results of those models more accurate, more timely, etc.

In some examples, one or more rules can be used to determine a first merchant offering and second merchant offering and/or rank the first merchant offering or the second merchant offering. In some examples, interaction data may be available to help determine the merchant offerings and/or to rank the merchant offerings. Such interaction data may include, for example, merchant data, transaction data, customer data, appointment data, inventory data, or other types of data or factors such as those determined to be relevant by machine learning models as described more fully herein. In examples, the merchant data may indicate merchants that are associated with the payment service as well as types of items that the merchants sell, locations of the merchants, etc. The transaction data may indicate details about prior transactions with the user at issue, including previous merchants involved in those transactions, items purchased in those transactions, recency of various transactions, etc. The customer data may indicate one or more user preferences associated with the user, prior interactions by the user with the payment service or the payment application (including those interactions not necessarily tied to transactions), etc. The appointment data may indicate availability of services that may correspond to the item(s) as well as availability of the user in question. The inventory data may indicate availability of goods for sale by the various merchants. The item identification component may be configured to utilize some or all of this data to identify and rank candidate merchant offerings that correspond to the individual items on the list of items. In some examples, the candidate merchant offerings may be determined based at least in part on the words determined from the image data processing described herein, on phrases that correspond to the determined words, or representations of the words such as where a symbol or other non-textual marking is provided by the user.

At block 808, the process 800 may include facilitating purchase of the first item and second item. For example, a payment component of the payment service may be configured to present options for initiating a transaction to purchase the first item and the second item. These options may include the use of one or more installment plans, price tracking options, etc. Here, facilitating the purchase of multiple items from multiple merchants at the same time represents a departure from single-merchant transactions, which include authentication requirements and digital communication restraints between user devices, merchant devices, payment service systems, and payment instrument institutions. Given the complex nature of sending personal account numbers and authentication information through and to each of these devices and systems, often times requiring multiple levels of encryption and decryption in a short period of time, current systems are not configured to complete a digital transaction that involves more than one merchant. The computer-centric solutions described herein allow for the payment service to facilitate multiple transactions with various merchants (e.g., a merchant for each of the items in the list of items) by generating user-specific and transaction-specific interactive elements embedded with data that allows a user to select the items for sale and to securely communicate data associated with the transaction such that the described payment service can communicate with payment instrument institutions as well as systems storing user balance accounts to cause a transaction to be performed with multiple merchants utilizing the communication protocols and authentication requirements of those various systems and without requiring coding changes by such systems. This can be performed by the payment service utilizing a standardized format for communicating transaction updates between users and with merchant systems.

At block 810, the process 800 may include withdrawing, from a stored balance account associated with the user, an amount based on an installment plan. For example, once a cost for the transaction is determined based at least in part on purchase options that were selected by the user, the payment component of the payment service may call the stored balance account of the user and request withdrawal of an amount of funds based on the purchase options selected. The funds may be deposited into one or more merchant accounts associated with the merchant(s) or into an account associated with the payment service, depending on the purchase options that were selected.

To allow for the withdrawal of funds based on an installment plan as described in block 810, transactions such as those described herein require data transmission across disparate devices and systems all within a limited period of time. This would typically lead to networking issues in the network of devices where communication protocols across the various device and system type typically differ. However, utilizing the techniques described herein, a network of user devices and systems such as the payment service may be generated when transactions such as those described herein are identified. This allows for a time sensitive determination of which user account should be withdrawn from, which merchant account should have funds deposited into, and when such transactions should occur.

While FIG. 8 references payment and withdrawal according to an installment plan, as described above, additional or alternative payment methods can be used for purchasing items identified using techniques described herein.

Figure 9:
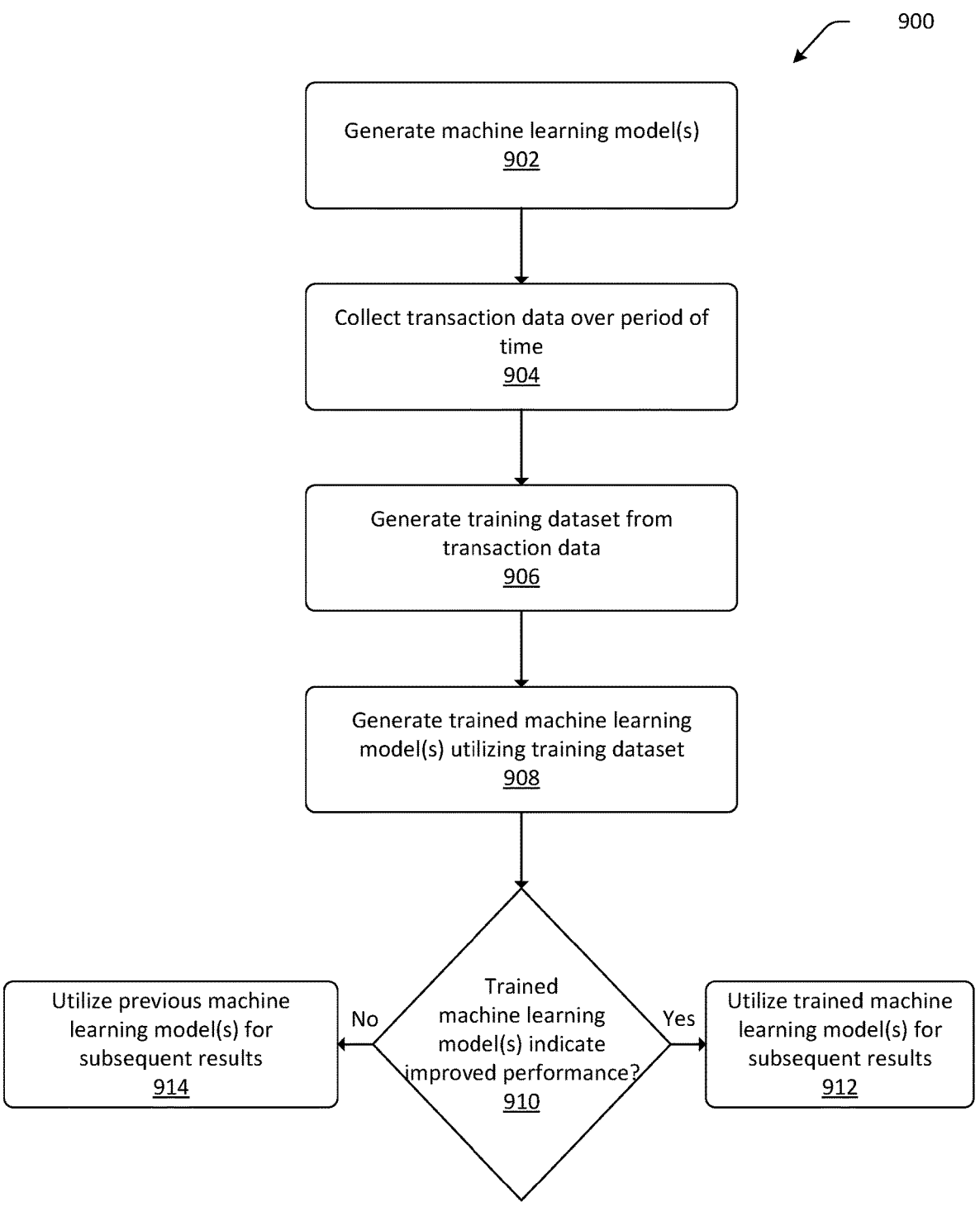
FIG. 9 is a flow diagram of an example process for the generation and training of machine learning models to perform one or more of the processes described herein, according to an embodiment described herein.

FIG. 9 is a flow diagram of an example process 900 for the generation and training of machine learning models to perform one or more of the processes described herein, according to an embodiment described herein. The order in which the operations or steps are described is not intended to be construed as a limitation, and any number of the described operations may be combined in any order and/or in parallel to implement process 900.

At block 902, the process 900 may include generating one or more machine learning models. For example, the machine learning models may utilize predictive analytic techniques, which may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Information from stored and/or accessible data may be extracted from one or more databases, such as the datastore(s) 130, and may be utilized to predict trends and behavior patterns. The predictive analytic techniques may be utilized to determine associations and/or relationships between explanatory variables and predicted variables from past occurrences and utilizing these variables to predict the unknown outcome. The predictive analytic techniques may include defining the outcome and data sets used to predict the outcome.

Data analysis may include using one or more models, including for example one or more algorithms, to inspect the data with the goal of identifying useful information and arriving at one or more determinations that assist in predicting the outcome of interest. One or more validation operations may be performed, such as using statistical analysis techniques, to validate accuracy of the models. Thereafter predictive modelling may be performed to generate accurate predictive models.

At block 904, the process 900 may include collecting transaction data over a period of time. The transaction data may include any of the data described with respect to the datastore(s) 130, any data associated with transactions initiated utilizing the image analysis techniques described herein, any data described with respect to FIGS. 1-7, or any other data that may be utilized to perform the operations described herein. This information may include factors associated with items determine from the image analysis, merchant offerings determined to be associated with the identified items, user feedback, interactions with the payment application, interactions with interactive elements, etc.

At block 906, the process 900 may include generating a training dataset from the transaction data. Generation of the training dataset may include formatting the transaction data into input vectors for the machine learning model to intake, as well as associating the various data with the outcomes of the transactions described herein.

At block 908, the process 900 may include generating one or more trained machine learning models utilizing the training dataset. Generation of the trained machine learning models may include updating parameters and/or weightings and/or thresholds utilized by the models to generate item identifications, merchant offering identifications, recommendations, user preferences, interactive elements, installment plan options, etc. based at least in part on the data from the training dataset.

For example, a machine learning model may be generated and configured to determine which of several merchant offerings to presented to a user for an identified item in a list of items. To train the model, a training dataset indicating characteristics of the user, characteristics of the items, characteristics of the potential merchants, and feedback data indicating how certain users have interacted with previously-recommended merchant offerings may be utilized. This data may serve to adjust weights and threshold that the model utilizes for these and other data types to determine how certain data impacts which merchant offerings are selected. The output of these trained machine learning models may be a more accurate or targeted determination of a merchant offering to be presented to a given user.

Additionally, a machine learning model may be generated and configured to determine whether and what types of installment payment plans to offer to users. Again, a training dataset indicating characteristics of the user and feedback data indicating how certain installment plans were previously chosen and whether users successfully paid each installment on such plans may be utilized to train the model.

The output of these trained machine learning models may be a more accurate or targeted determination of which install-ment plan options to present to a given user.

At block 910, the process 900 may include determining whether the trained machine learning models indicate improved performance metrics. For example, a testing group may be generated where the outcomes of the transactions are known but not to the trained machine learning models. The trained machine learning models may generate results, which may be compared to the known results to determine whether the results of the trained machine learning model produce a superior result than the results of the machine learning model prior to training.

In examples where the trained machine learning models indicate improved performance metrics, the process 900 may include, at block 912, utilizing the trained machine learning models for generating subsequent results. For example, the trained machine learning models may be utilized to generate interactive elements, to identify charac-teristics of items, to identify items from handwritten lists of items, to determine merchant offerings associated with the items, etc. Additionally, the trained machine learning models may be utilized to adjust or recommend adjusting user preferences or condition thresholds as described herein. It should be understood that the trained machine learning models may be utilized in any scenario where models are utilized as described herein.

In examples where the trained machine learning models do not indicate improved performance metrics, the process 900 may include, at block 914, utilizing the previous itera-tion of the machine learning models for generating subse-quent results.

Figure 10:
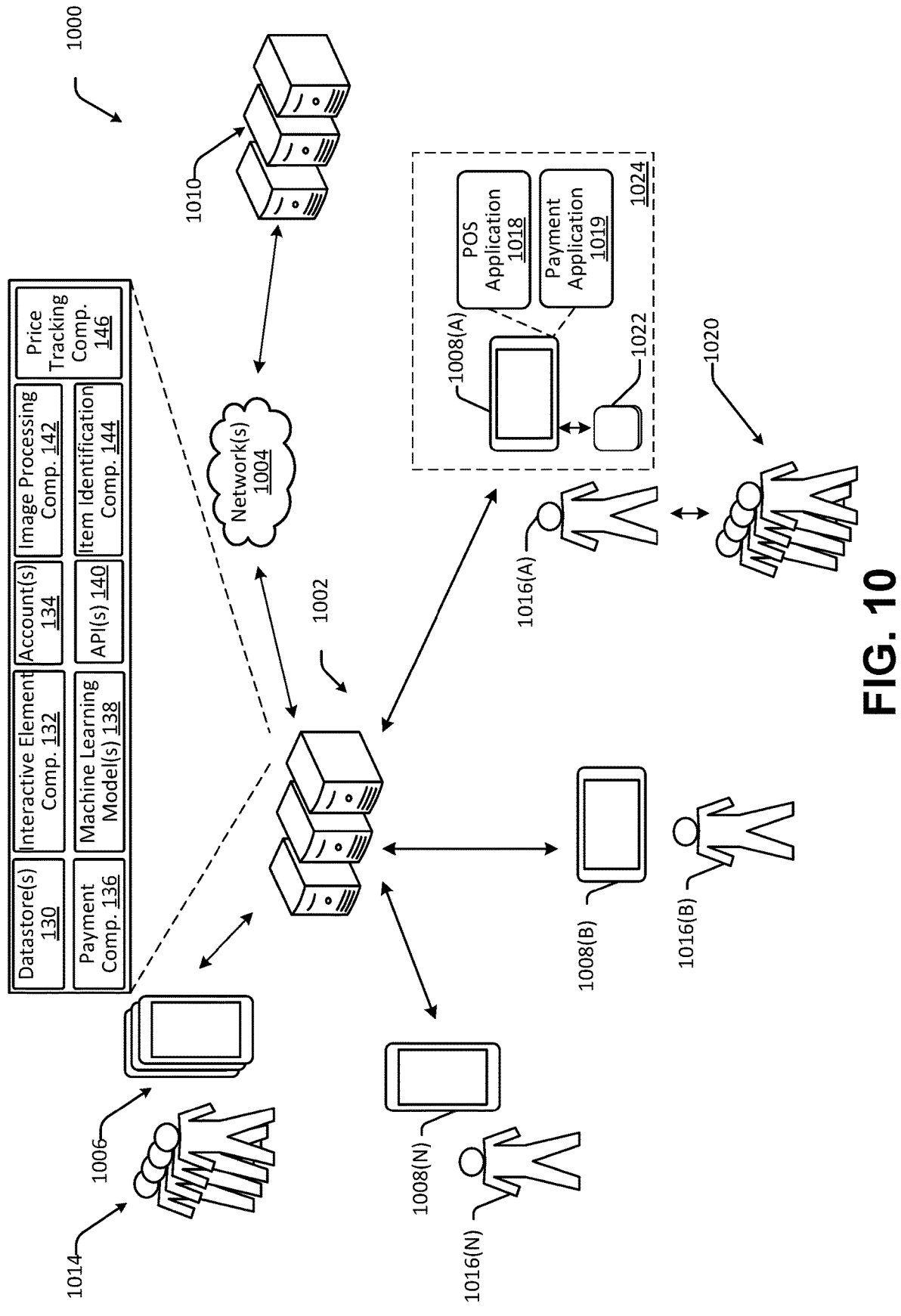
FIG. 10 is an example environment with user devices, merchant devices, a payment service, and/or other systems that may be involved in a transaction, such as by utilizing the payment application as configured herein, according to an embodiment described herein.

FIG. 10 is an example environment with user devices, merchant devices, a payment service, and/or other systems that may be involved in a transaction, such as by utilizing the payment application as configured herein, according to an embodiment described herein. The environment 1000 includes server(s) 1002 that can communicate over a net-work 1004 with user devices 1006 (which, in some examples can be merchant devices 1008 (individually, 1008(A)-1008(N))) and/or server(s) 1010 associated with third-party service provider(s). The server(s) 1002 can be associated with a service provider that can provide one or more services for the benefit of users 1014, as described below. Actions attributed to the service provider can be performed by the server(s) 1002.

In examples, the server(s) 1002 may be the same as or similar to the payment service 104 from FIG. 1, which may include the same or similar components as described with respect to the payment service 104 of FIG. 1, including the components of the CRM 128 as shown in FIG. 10. Further, the user devices 102 from FIG. 1 may have the same or similar components and perform the same or similar func-tionality as the user devices 1006 from FIG. 10.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wear-able computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employ-ers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

As described above, in at least one example, the users 1014 can include merchants 1016 (individually, 1016(A)-1016(N)). In an example, the merchants 1016 can operate respective merchant devices 1008, which can be user devices 1006 configured for use by merchants 1016. For the purpose of this discussion, a "merchant" can be any entity that offers items (e.g., goods or services) for purchase or other means of acquisition (e.g., rent, borrow, barter, etc.). The merchants 1016 can offer items for purchase or other means of acquisition via brick-and-mortar stores, mobile stores (e.g., pop-up shops, food trucks, etc.), online stores, combinations of the foregoing, and so forth. In some examples, at least some of the merchants 1016 can be associated with a same entity but can have different mer-chant locations and/or can have franchise/franchisee rela-tionships. In additional or alternative examples, the mer-chants 1016 can be different merchants. That is, in at least one example, the merchant 1016(A) is a different merchant than the merchant 1016(B) and/or the merchant 1016(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relation-ships. Such merchants—with various merchant locations or franchise/franchisee relationships—can be referred to as merchants having different merchant locations and/or dif-ferent commerce channels.

Each merchant device 1008 can have an instance of a POS application 1018 stored thereon. The POS application 1018 can configure the merchant device 1008 as a POS terminal, which enables the merchant 1016(A) to interact with one or more customers 1020. As described above, the users 1014 can include customers, such as the customers 1020 shown as interacting with the merchant 1016(A). For the purpose of this discussion, a "customer" can be any entity that acquires items from merchants. While only two customers 1020 are illustrated in FIG. 10, any number of customers 1020 can interact with the merchants 1016. Further, while FIG. 10 illustrates the customers 1020 interacting with the merchant 1016(A), the customers 1020 can interact with any of the merchants 1016.

In at least one example, interactions between the custom-ers 1020 and the merchants 1016 that involve the exchange of funds (from the customers 1020) for items (from the merchants 1016) can be referred to as "transactions." In at least one example, the POS application 1018 can determine transaction data associated with the POS transactions. Transaction data can include payment information, which can be obtained from a reader device 1022 associated with the merchant device 1008(A), user authentication data, purchase amount information, point-of-purchase information (e.g., item(s) purchased, date of purchase, time of purchase, etc.), etc. The POS application 1018 can send transaction data to the server(s) 1002 such that the server(s) 1002 can track transactions of the customers 1020, merchants 1016, and/or any of the users 1014 over time. Furthermore, the POS application 1018 can present a UI to enable the merchant 1016(A) to interact with the POS application 1018 and/or the service provider via the POS application 1018.

In at least one example, the merchant device 1008(A) can be a special-purpose computing device configured as a POS terminal (via the execution of the POS application 1018). In at least one example, the POS terminal may be connected to a reader device 1022, which is capable of accepting a variety of payment instruments, such as credit cards, debit cards, gift cards, short-range communication based payment instruments, and the like, as described below. In at least one example, the reader device 1022 can plug in to a port in the merchant device 1008(A), such as a microphone port, a headphone port, an audio-jack, a data port, or other suitable port. In additional or alternative examples, the reader device 1022 can be coupled to the merchant device 1008(A) via another wired or wireless connection, such as via a Bluetooth®, BLE, and so on. In some examples, the reader device 1022 can read information from alternative payment instruments including, but not limited to, wristbands and the like.

In some examples, the reader device 1022 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1022, and communicate with the server(s) 1002, which can provide, among other services, a payment processing service. The server(s) 1002 associated with the service provider can communicate with server(s) 1010, as described below. In this manner, the POS terminal and reader device 1022 may collectively process transaction(s) between the merchants 1016 and customers 1020. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 1022 of the POS system 1024 are shown as separate devices, in additional or alternative examples, the POS terminal and the reader device 1022 can be part of a single device. In some examples, the reader device 1022 can have a display integrated therein for presenting information to the customers 1020. In additional or alternative examples, the POS terminal can have a display integrated therein for presenting information to the customers 1020. POS systems, such as the POS system 1024, may be mobile, such that POS terminals and reader devices may process transactions in disparate locations across the world. POS systems can be used for processing card-present transactions and card-not-present (CNP) transactions, as described below.

A card-present transaction is a transaction where both a customer 1020 and his or her payment instrument are physically present at the time of the transaction. Card-present transactions may be processed by swipes, dips, taps, or any other interaction between a physical payment instrument (e.g., a card), or otherwise present payment instrument, and a reader device 1022 whereby the reader device 1022 is able to obtain payment data from the payment instrument. A swipe is a card-present transaction where a customer 1020 slides a card, or other payment instrument, having a magnetic strip through a reader device 1022 that captures payment data contained in the magnetic strip. A dip is a card-present transaction where a customer 1020 inserts a payment instrument having an embedded microchip (i.e., chip) into a reader device 1022 first. The dipped payment instrument remains in the payment reader until the reader device 1022 prompts the customer 1020 to remove the card, or other payment instrument. While the payment instrument is in the reader device 1022, the microchip can create a one-time code which is sent from the POS system 1024 to the server(s) 1010 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 1020 may tap or hover his or her payment instrument (e.g., card, electronic device such as a smart phone running a payment application, etc.) over a reader device 1022 to complete a transaction via short-range communication (e.g., NFC, RFID, Bluetooth®, BLE, etc.). Short-range communication enables the payment instrument to exchange information with the reader device 1022. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 1024, the server(s) 1002, and/or the server(s) 1010 may exchange payment information and transaction data to determine whether transactions are authorized. For example, the POS system 1024 may provide encrypted payment data, user authentication data, purchase amount information, point-of-purchase information, etc. (collectively, transaction data) to server(s) 1002 over the network(s) 1004. The server(s) 1002 may send the transaction data to the server(s) 1010. As described above, in at least one example, the server(s) 1010 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 1010 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 1010 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 1010 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 1010 associated therewith), and a payment authorization message is communicated from the issuer to the POS device via a path opposite of that described above, or via an alternate path.

As described above, the server(s) 1010, which can be associated with payment service provider(s), may determine whether the transaction is authorized based on the transaction data, as well as information relating to parties to the transaction (e.g., the customer 1020 and/or the merchant 1016(A)). The server(s) 1010 may send an authorization notification over the network(s) 1004 to the server(s) 1002, which may send the authorization notification to the POS system 1024 over the network(s) 1004 to indicate whether the transaction is authorized. The server(s) 1002 may also transmit additional information such as transaction identifiers to the POS system 1024. In one example, the server(s) 1002 may include a merchant application and/or other functional components for communicating with the POS system 1024 and/or the server(s) 1010 to authorize or decline transactions.

Based on the authentication notification that is received by the POS system 1024 from server(s) 1002, the merchant 1016(A) may indicate to the customer 1020 whether the transaction has been approved. In some examples, approval may be indicated at the POS system 1024, for example, at a display of the POS system 1024. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 1014 can access all of the services of the service provider. In other examples, the users 1014 can have gradated access to the services, which can be based on risk tolerance, IDV outputs, subscriptions, and so on. In at least one example, access to such services can be availed to the merchants 1016 via the POS application 1018. In additional or alternative examples, each service can be associated with its own access point (e.g., application, web browser, etc.).

The service provider can offer payment processing services for processing payments on behalf of the merchants 1016, as described above. For example, the service provider can provision payment processing software, payment processing hardware and/or payment processing services to merchants 1016, as described above, to enable the merchants 1016 to receive payments from the customers 1020 when conducting POS transactions with the customers 1020. For instance, the service provider can enable the merchants 1016 to receive cash payments, payment card payments, and/or electronic payments from customers 1020 for POS transactions and the service provider can process transactions on behalf of the merchants 1016.

As the service provider processes transactions on behalf of the merchants 1016, the service provider can maintain accounts or balances for the merchants 1016 in one or more ledgers. For example, the service provider can analyze transaction data received for a transaction to determine an amount of funds owed to a merchant 1016(A) for the transaction. In at least one example, such an amount can be a total purchase price less fees charged by the service provider for providing the payment processing services. Based on determining the amount of funds owed to the merchant 1016(A), the service provider can deposit funds into an account of the merchant 1016(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 1016(A) to a bank account of the merchant 1016 (A) that is held at a bank or other financial institution (e.g., associated with the server(s) 1010). Scheduled deposits can occur at a prearranged time after a POS transaction is funded, which can be a business day after the POS transaction occurred, or sooner or later. In some examples, the merchant 1016(A) can access funds prior to a scheduled deposit. For instance, the merchant 1016(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 1016(A) can have a payment instrument that is linked to the stored balance that enables the merchant to access the funds without first transferring the funds from the account managed by the service provider to the bank account of the merchant 1016(A).

In at least one example, the service provider may provide inventory management services. That is, the service provider may provide inventory tracking and reporting. Inventory management services may enable the merchant 1016(A) to access and manage a database storing data associated with a quantity of each item that the merchant 1016(A) has available (i.e., an inventory). Furthermore, in at least one example, the service provider can provide catalog management services to enable the merchant 1016(A) to maintain a catalog, which can be a database storing data associated with items that the merchant 1016(A) has available for acquisition (i.e., catalog management services). In at least one example, the catalog may include a plurality of data items and a data item of the plurality of data items may represent an item that the merchant 1016(A) has available for acquisition. The service provider can offer recommendations related to pricing of the items, placement of items on the catalog, and multi-party fulfilment of the inventory.

In at least one example, the service provider can provide business banking services, which allow the merchant 1016 (A) to track deposits (from payment processing and/or other sources of funds) into an account of the merchant 1016(A), payroll payments from the account (e.g., payments to employees of the merchant 1016(A)), payments to other merchants (e.g., business-to-business) directly from the account or from a linked debit card, withdrawals made via scheduled deposit and/or instant deposit, etc. Furthermore, the business banking services can enable the merchant 1016(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1016 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1016. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 1012 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 1014 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1016. In at least one example, the service provider can recommend and/or generate content items to supplement omni-channel presences of the merchants 1016. That is, if a merchant of the merchants 1016 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 1014 to set schedules for scheduling appointments and/or users 1014 to schedule appointments.

In some examples, the service provider can provide restaurant management services to enable users 1014 to make and/or manage reservations, to monitor front-of-house and/or back-of-house operations, and so on. In such examples, the merchant device(s) 1008 and/or server(s) 1002 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 1014 who can travel between locations to perform services for a requesting user 1014 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 1006.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 1014, voice inputs into a virtual assistant or the like, to determine intents of user(s) 1014. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 1014 may be new to the service provider such that the user 1014 that has not registered (e.g., subscribed to receive access to one or more services offered by the service provider) with the service provider. The service provider can offer onboarding services for registering a potential user 1014 with the service provider. In some examples, onboarding can involve presenting various questions, prompts, and the like to a potential user 1014 to obtain information that can be used to generate a profile for the potential user 1014. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1014 providing all necessary information, the potential user 1014 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 1010). That is, the service provider can offer IDV services to verify the identity of users 1014 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 1014 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 1010 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 1002) and/or the server(s) 1010 via the network(s) 1004. In some examples, the merchant device(s) 1008 are not capable of connecting with the service provider (e.g., the server(s) 1002) and/or the server(s) 1010, due to a network connectivity issue, for example. In additional or alternative examples, the server(s) 1002 are not capable of communicating with the server(s) 1010 due to network connectivity issue, for example. In such examples, devices may operate in "offline" mode where at least some payment data is stored (e.g., on the merchant device(s) 1008) and/or the server(s) 1002 until connectivity is restored and the payment data can be transmitted to the server(s) 1002 and/or the server(s) 1010 for processing.

In at least one example, the service provider can be associated with a hub, such as an order hub, an inventory hub, a fulfillment hub and so on, which can enable integration with one or more additional service providers (e.g., associated with the additional server(s) 1010). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 1006 that are in communication with one or more server computing devices 1002 of the service provider. That is, techniques described herein are directed to a specific implementation—or, a practical application—of utilizing a distributed system of user devices 1006 that are in communication with one or more server computing devices 1002 of the service provider to perform a variety of services, as described above. The unconventional configuration of the distributed system described herein enables the server(s) 1002 that are remotely-located from end-users (e.g., users 1014) to intelligently offer services based on aggregated data associated with the end-users, such as the users 1014 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1014 and user devices 1006. Furthermore, such features are changed dynamically based on the profiles of the users involved interacting with the GUIs. As such, techniques described herein are directed to improvements to computing systems.

Figure 11:
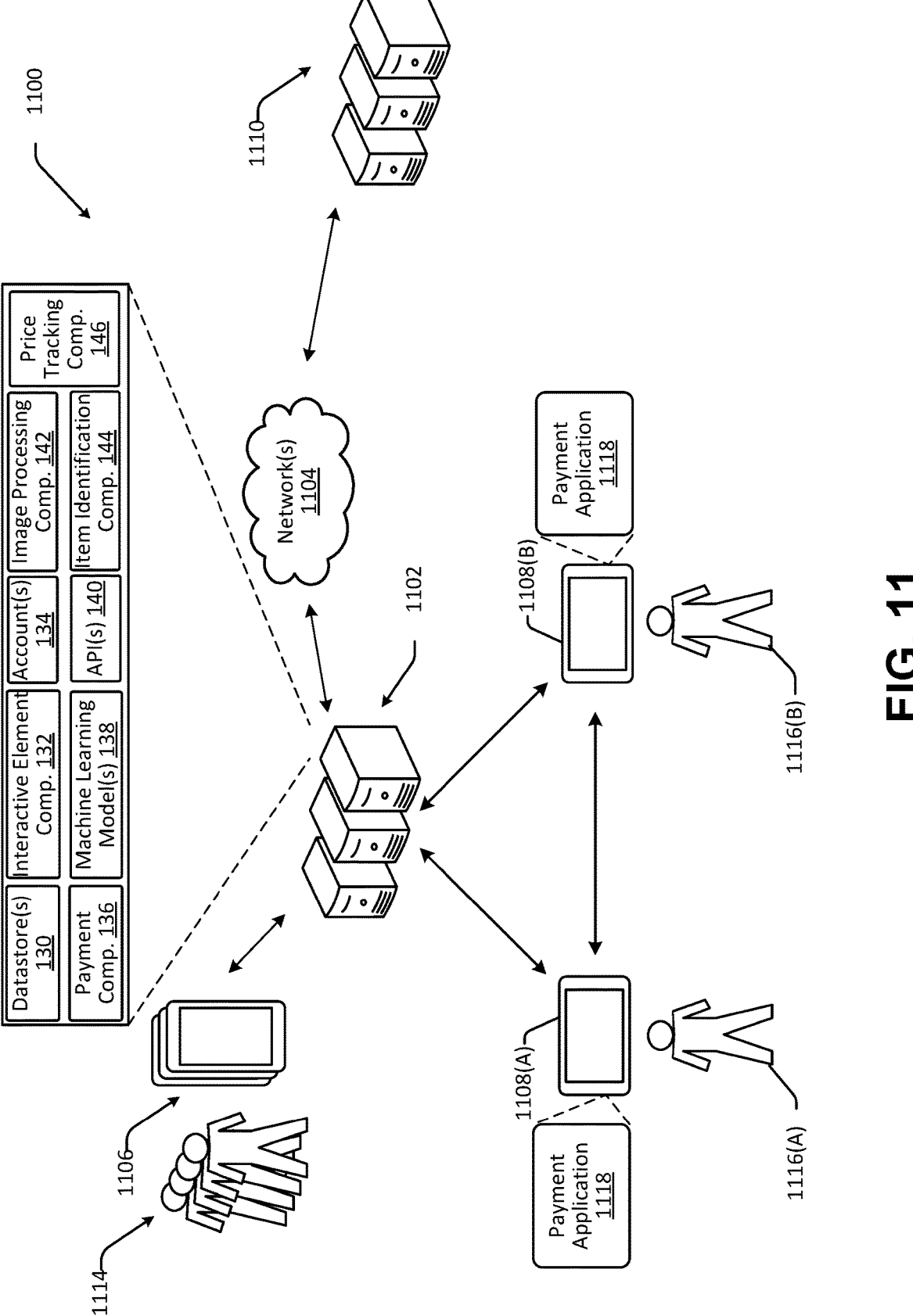
FIG. 11 is an example environment illustrating usage of the payment application, such as described herein, according to an embodiment described herein.

FIG. 11 is an example environment illustrating usage of the payment application, according to an embodiment described herein. The environment 1100 includes server(s) 1102 that can communicate over a network 1104 with user devices 1106 (which, in some examples can be user devices 1108 (individually, 1108(A), 1108(B)) and/or server(s) 1110 associated with third-party service provider(s). The server(s) 1102 can be associated with a service provider that can provide one or more services for the benefit of users 1114, as described below. Actions attributed to the service provider can be performed by the server(s) 1102. In some examples, the service provider referenced in FIG. 10 can be the same or different than the service provider referenced in FIG. 11.

As described herein, the server(s) 1102 may be the same or similar to the payment service 104 described with respect to FIG. 1, which may include the same or similar components as described with respect to the payment service 104 of FIG. 1, including the components of the CRM 128, as shown in FIG. 11. The user devices 1106, 1108 may be the same or similar to the user device 102 described with respect to FIG. 1. The server(s) 1110 associated with third-party service provider(s) may be the same as or similar to the systems associated with payment services or the like, as described herein.

The environment 1100 can include a plurality of user devices 1106, as described above. Each one of the plurality of user devices 1106 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1114. The users 1114 can be referred to as customers, buyers, merchants, sellers, borrowers, employees, employers, payors, payees, couriers and so on. The users 1114 can interact with the user devices 1106 via user interfaces presented via the user devices 1106. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1106 can have an instance or versioned instance of an application, which can be downloaded from an application store, for example, which can present the user interface(s) described herein. In at least one example, a user 1114 can interact with the user interface via touch input, spoken input, or any other type of input.

In at least one example, the service provider can provide a peer-to-peer payment service that enables peer-to-peer payments between two or more users 1114. Two users, user 1116(A) and user 1116(B) are illustrated in FIG. 11 as "peers" in a peer-to-peer payment. In at least one example, the service provider can communicate with instances of a payment application 1118 (or other access point) installed on devices 1106 configured for operation by users 1114. In an example, an instance of the payment application 1118 executing on a first device 1108(A) operated by a payor (e.g., user 1116(A)) can send a request to the service provider to transfer an asset (e.g., fiat currency, non-fiat currency, cryptocurrency, securities, gift cards, and/or related assets) from the payor to a payee (e.g., user 1116(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 12:
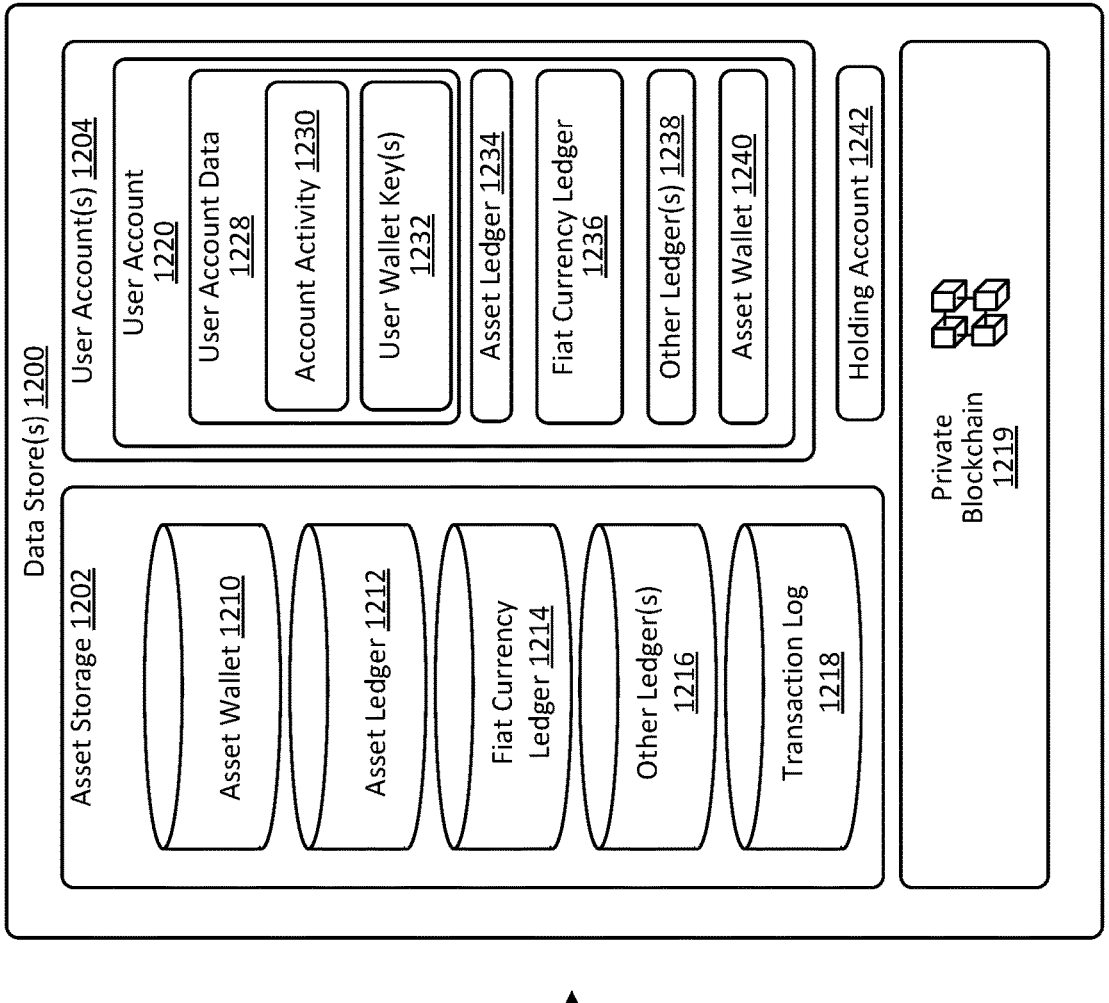
FIG. 12 is an example of datastore(s) that can be associated with servers of the payment service, according to an embodiment described herein.

In some examples, the service provider can utilize a ledger system to track transfers of assets between users 1106. FIG. 12, below, provides additional details associated with such a ledger system. The ledger system can enable users 1106 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1118 executing on user device(s) of payee(s). As an example, the service provider can transfer assets from an account of user 1116(A) to an account of the user 1116(B) and can send a notification to the user device 1108(B) of the user 1116(B) for presentation via a user interface. The notification can indicate that a transfer is in process, a transfer is complete, or the like. In some examples, the service provider can send additional or alternative information to the instances of the payment application 1118 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1102 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1118 executing on the user devices 1106. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a given platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 11. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1106 (e.g., mobile device or conventional personal computer (PC)) based on instructions transmitted to and from the server(s) 1102 (which, in such an example can be called a "messaging server"). In some instances, the messaging application can include a payment application with messaging capability that enables users of the payment application to communicate with one another. In such instances, the payment application can be executed on a user device 1106 based on instructions transmitted to and from the server(s) 1102 (e.g., the payment service discussed in this description or another payment service that supports payment transactions). In some examples, the messaging application can be provided by a third-party service provider associated with the server(s) 1110. In examples where the messaging application is a third-party service provider, the server(s) 1110 can be accessible via one or more APIs or other integrations.

As described above, the service provider can facilitate peer-to-peer transactions, which can enable users 1106 to transfer fiat currency, non-fiat currency, cryptocurrency, securities, or other assets, or portions thereof, to other users 1106. In at least one example, individual users can be associated with user accounts. Additional details associated with user accounts and the transfer of assets between users 1106 are described below with reference to FIG. 12.

Furthermore, the service provider of FIG. 11 can enable users 1106 to perform banking transactions via instances of the payment application 1118. For example, users can configure direct deposits or other deposits for adding assets to their various ledgers/balances. Further, users 1106 can configure bill pay, recurring payments, and/or the like using assets associated with their accounts. In addition to sending and/or receiving assets via peer-to-peer transactions, users 1106 buy and/or sell assets via asset networks such as cryptocurrency networks, securities networks, and/or the like.

FIG. 12 is an example of data store(s) that can be associated with servers of the payment service, according to an embodiment described herein. In at least one example, the data store(s) 1200 can store assets in an asset storage 1202, as well as data in user account(s) 1204, merchant account(s) 1206, and/or customer account(s) 1208. In at least one example, the asset storage 1202 can be used to store assets managed by the service provider of FIG. 11. In at least one example, the asset storage 1202 can be used to record whether individual of the assets are registered to users. For example, the asset storage 1202 can include an asset wallet 1210 for storing records of assets owned by the service provider of FIG. 11, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1110 can be associated therewith. In some examples, the asset wallet 1210 can communication with the asset network via one or more components associated with the server(s) 1102.

The asset wallet 1210 can be associated with one or more addresses and can vary addresses used to acquire assets (e.g., from the asset network(s)) so that its holdings are represented under a variety of addresses on the asset network. In examples where the service provider of FIG. 11 has its own holdings of cryptocurrency (e.g., in the asset wallet 1210), a user can acquire cryptocurrency directly from the service provider of FIG. 11. In some examples, the service provider of FIG. 11 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1202 may contain ledgers that store records of assignments of assets to users 1106. Specifically, the asset storage 1202 may include asset ledger 1210, fiat currency ledger 1214, and other ledger(s) 1216, which can be used to record transfers of assets between users 1106 of the service provider and/or one or more third-parties (e.g., merchant network(s), payment card network(s), ACH network(s), equities network(s), the asset network, securities networks, etc.). In doing so, the asset storage 1202 can maintain a running balance of assets managed by the service provider of FIG. 11. The ledger(s) of the asset storage 1202 can further indicate some of the running balance for each of the ledger(s) stored in the asset storage 1202 is assigned or registered to one or more user account(s) 1204.

In at least one example, the asset storage 1202 can include transaction logs 1218, which can include records of past transactions involving the service provider of FIG. 11. In at least one example, transaction data, as described herein, can be stored in association with the transaction logs 1218.

In some examples, the data store(s) 1200 can store a private blockchain 1219. A private blockchain 1219 can function to record sender addresses, recipient addresses, public keys, values of cryptocurrency transferred, and/or can be used to verify ownership of cryptocurrency tokens to be transferred. In some examples, the service provider of FIG. 11 can record transactions taking place within the service provider of FIG. 11 involving cryptocurrency until the number of transactions has exceeded a determined limit (e.g., number of transactions, storage space allocation, etc.). Based at least in part on determining that the limit has been reached, the service provider of FIG. 11 can publish the transactions in the private blockchain 1219 to a public blockchain (e.g., associated with the asset network), where miners can verify the transactions and record the transactions to blocks on the public blockchain. In at least one example, the service provider of FIG. 11 can participate as miner(s) at least for its transactions to be posted to the public blockchain.

In at least one example, the data store(s) 1200 can store and/or manage accounts, such as user account(s) 1204, merchant account(s) 1206, and/or customer account(s) 1208. In at least one example, the user account(s) 1204 may store records of user accounts associated with the users 1106. In at least one example, the user account(s) 1204 can include a user account 1220, which can be associated with a user (of the users 1106). Other user accounts of the user account(s) 1204 can be similarly structured to the user account 1 220, according to some examples. In other examples, other user accounts may include more or less data and/or account information than that provided by the user account 1 220. In at least one example, the user account 1 2 20 can include user account data 1228, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1228 can include account activity 1 2 30 and user wallet key(s) 1 2 32. The account activity 1 2 30 may include a transaction log for recording transactions associated with the user account 12 20. In some examples, the user wallet key(s) 1232 can include a public-private key-pair and a respective address associated with the asset network or other asset networks. In some examples, the user wallet key(s) 1 2 32 may include one or more key pairs, which can be unique to the asset network or other asset networks.

In addition to the user account data 1228, the user account 1220 can include ledger(s) for account(s) managed by the service provider of FIG. 11, for the user. For example, the user account 1220 may include an asset ledger 1234, a fiat currency ledger 1 2 36, and/or one or more other ledgers 1238. The ledger(s) can indicate that a corresponding user utilizes the service provider of FIG. 11 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 11.

In some examples, the asset ledger 1234 can store a balance for each of one or more cryptocurrencies (e.g., Bitcoin, Ethereum, Litecoin, etc.) registered to the user account 12 20. In at least one example, the asset ledger 1234 can further record transactions of cryptocurrency assets associated with the user account 1220. For example, the user account 1220 can receive cryptocurrency from the asset network using the user wallet key(s) 1 2 32. In some examples, the user wallet key(s) 1232 may be generated for the user upon request. User wallet key(s) 1232 can be requested by the user in order to send, exchange, or otherwise control the balance of cryptocurrency held by the service provider of FIG. 11 (e.g., in the asset wallet 1210) and registered to the user. In some examples, the user wallet key(s) 1 2 32 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 11 and the value is credited as a balance in asset ledger 1234), by purchasing currency in the form associated with the account using currency in a different form (e.g., buying a value of cryptocurrency from the service provider of FIG. 11 using a value of fiat currency reflected in fiat currency ledger 1214, and crediting the value of cryptocurrency in asset ledger 1234), or by conducting a transaction with another user (customer or merchant) of the service provider of FIG. 11 wherein the account receives incoming currency (which can be in the form associated with the account or a different form, in which the incoming currency may be converted to the form associated with the account). In some examples, the user account data 1228 can include preferences for maintaining balances of individual of the ledgers. For example, the service provider of FIG. 11 can automatically debit the fiat currency ledger 1236 to increase the asset ledger 1234, or another account associated with the user whenever the cryptocurrency balance (e.g., of the asset ledger 1234) falls below a stated level (e.g., a threshold). Conversely, in some embodiments, the service provider of FIG. 11 can automatically credit the fiat currency ledger 1236 to decrease the asset ledger 1234 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with the third-party server(s)) unrelated to the service provider of FIG. 11 (i.e., an external account). In at least one example, the user can transfer all or a portion of a balance of the cryptocurrency stored in the third-party cryptocurrency wallet to the service provider of FIG. 11. Such a transaction can require the user to transfer an amount of the cryptocurrency in a message signed by user's private key to an address provided by the service provider of FIG. 11. In at least one example, the transaction can be sent to miners to bundle the transaction into a block of transactions and to verify the authenticity of the transactions in the block. Once a miner has verified the block, the block is written to a public, distributed blockchain where the service provider of FIG. 11 can then verify that the transaction has been confirmed and can credit the user's asset ledger 1234 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 11. As described above, in some examples, the service provider of FIG. 11 can acquire cryptocurrency from a third-party source (e.g., associated with the third-party server(s) 118). In such examples, the asset wallet 1210 can be associated with different addresses and can vary addresses used to acquire cryptocurrency so that its holdings are represented under a variety of addresses on a blockchain. When the service provider of FIG. 11 has their own holdings of cryptocurrency, users can acquire cryptocurrency directly from the service provider of FIG. 11. In some examples, the service provider of FIG. 11 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 11 has its own cryptocurrency assets, cryptocurrency transferred in a transaction (e.g., data with address provided for receipt of transaction and a balance of cryptocurrency transferred in the transaction) can be stored in the asset wallet 1210. In at least one example, the service provider of FIG. 11 can credit the asset ledger 1234 of the user. Additionally, while the service provider of FIG. 11 recognizes that the user retains the value of the transferred cryptocurrency through crediting the asset ledger 1234, any person that inspects the blockchain will see the cryptocurrency as having been transferred to the service provider of FIG. 11. In some examples, the asset wallet 1210 can be associated with many different addresses. In such examples, any person that inspects the blockchain may not easily associate all cryptocurrency stored in asset wallet 1210 as belonging to the same entity. It is this presence of a private ledger that is used for real-time transactions and maintained by the service provider of FIG. 11, combined with updates to the public ledger at other times, that allows for extremely fast transactions using cryptocurrency to be achieved. In some examples, the "private ledger" can refer to the asset ledger 1210, which in some examples, can utilize the private blockchain 1219, as described herein. The "public ledger" can correspond to a public blockchain associated with the asset network.

In at least one example, a user's asset ledger 1234, fiat currency ledger 1236, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1234. In some examples, a user can receive fiat currency or another currency in the form of payment for a transaction with another user. In at least one example, at least a portion of such funds can be converted into cryptocurrency by the service provider of FIG. 11 and used to fund the asset ledger 1234 of the user.

As addressed above, in some examples, users can also have other accounts maintained by the service provider of FIG. 11. For example, a user can also have an account in U.S. dollars, which can be tracked, for example, via the fiat currency ledger 1236. Such an account can be funded by transferring money from a bank account at a third-party bank to an account maintained by the service provider of FIG. 11 as is conventionally known. In some examples, a user can receive fiat currency in the form of payment for a transaction with another user. In such examples, at least a portion of such funds can be used to fund the fiat currency ledger 1236.

In some examples, a user can have one or more internal payment cards registered with the service provider of FIG. 11. Internal payment cards can be linked to one or more of the accounts associated with the user account 1220. In some embodiments, options with respect to internal payment cards can be adjusted and managed using an application (e.g., the payment application 1118).

In at least one example, as described above, each ledger can correspond to an account of the user that is managed by the service provider of FIG. 11. In at least one example, individual of the accounts can be associated with a wallet or a stored balance for use in payment transactions, peer-to-peer transactions, payroll payments, etc.

In at least one example, the user account 1220 can be associated with an asset wallet 1240. The asset wallet 1240 of the user can be associated with account information that can be stored in the user account data 1228 and, in some examples, can be associated with the user wallet key(s) 1232. In at least one example, the asset wallet 1240 can store data indicating an address provided for receipt of a cryptocurrency transaction. In at least one example, the balance of the asset wallet 1240 can be based at least in part on a balance of the asset ledger 1234. In at least one example, funds availed via the asset wallet 1240 can be stored in the asset wallet 1240 or the asset wallet 1210. Funds availed via the asset wallet 1210 can be tracked via the asset ledger 1234. The asset wallet 1240, however, can be associated with additional cryptocurrency funds.

In at least one example, when the service provider of FIG. 11 includes a private blockchain 1219 for recording and validating cryptocurrency transactions, the asset wallet 1240 can be used instead of, or in addition to, the asset ledger 1234. For example, at least one example, a merchant can provide the address of the asset wallet 1240 for receiving payments. In an example where a customer is paying in cryptocurrency and the customer has their own cryptocurrency wallet account associated with the service provider of FIG. 11, the customer can send a message signed by its private key including its wallet address (i.e., of the customer) and identifying the cryptocurrency and value to be transferred to the merchant's asset wallet 1240. The service provider of FIG. 11 can complete the transaction by reducing the cryptocurrency balance in the customer's cryptocurrency wallet and increasing the cryptocurrency balance in the merchant's asset wallet 1240. In addition to recording the transaction in the respective cryptocurrency wallets, the transaction can be recorded in the private blockchain 1219 and the transaction can be confirmed. A user can perform a similar transaction with cryptocurrency in a peer-to-peer transaction as described above. In at least one example, the cryptocurrency wallet account 1230 can be funded by a balance transfer from a third-party cryptocurrency wallet, as described above. Such a transaction can require a user to transfer an amount of cryptocurrency in a message signed by the user's private key to an address of the cryptocurrency wallet account 1230. The transferred amount of cryptocurrency can then be within the cryptocurrency wallet account 1230 for use in later transactions.

While the asset ledger 1234 and/or asset wallet 1240 are each described above with reference to cryptocurrency, the asset ledger 1234 and/or asset wallet 1240 can alternatively be used in association with securities. In some examples, different ledgers and/or wallets can be used for different types of assets. That is, in some examples, a user can have multiple asset ledgers and/or asset wallets for tracking cryptocurrency, securities, or the like.

The data stores 1200 may also include a holding account 1242, which may be similar to and perform similar functions as the holding account 146 described with respect to FIG. 1.

It should be noted that user(s) having accounts managed by the service provider of FIG. 11 is an aspect of the technology disclosed that enables technical advantages of increased processing speed and improved security.

Figure 13:
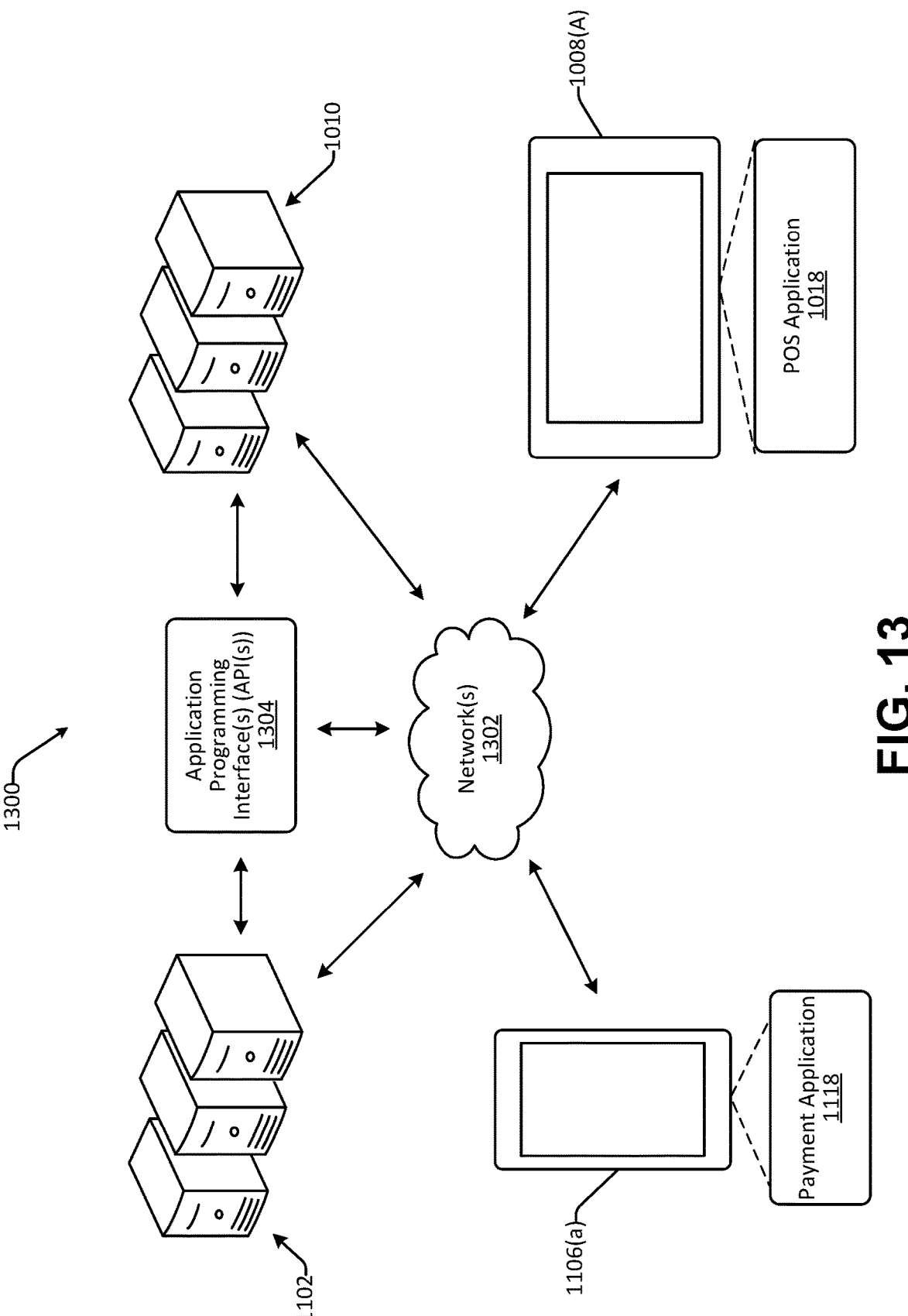
FIG. 13 is an example environment wherein the payment service environment of FIG. 10 and the environment from FIG. 11 can be integrated to enable payments at the point-of-sale using assets associated with user accounts in the peer-to-peer environment of FIG. 11, according to an embodiment described herein.

FIG. 13 is an example environment 1300 wherein the environment 1000 and the environment 1100 can be integrated to enable payments at the point-of-sale using assets associated with user accounts in the peer-to-peer environment of FIG. 11, according to an embodiment described herein. As illustrated, each of the components can communicate with one another via one or more networks 1302. In some examples, one or more APIs 1304 or other functional components can be used to facilitate such communication. For example, the APIs 1304 can be used to facilitate communication with payment service server(s) 1102 and server(s) 1110 associated with third-party service provider(s).

In at least one example, the example environment 1300 can enable contactless payments, via integration of peer-to-peer payment, or other payment making, platform(s) and payment processing platform(s), are described herein. For the purpose of FIG. 13, the environment 1000 can refer to a payment processing platform and the environment 1100 can refer to a peer-to-peer payment, or payment making, platform. In an example, such an integration can enable a customer to participate in a transaction via their own computing device instead of interacting with a merchant device of a merchant, such as the merchant device 1008(A). In such an example, the POS application 1018, associated with a payment processing platform and executable by the merchant device 1008(A) of the merchant, can present a Quick Response (QR) code, or other code that can be used to identify a transaction (e.g., a transaction code), in association with a transaction between the customer and the merchant. The QR code, or other transaction code, can be provided to the POS application 1018 via an API associated with the peer-to-peer payment platform. In an example, the customer can utilize their own computing device, such as the user device 1108(A), to capture the QR code, or the other transaction code, and to provide an indication of the captured QR code, or other transaction code, to server(s) 1002 and/or server(s) 1102.

Based at least in part on the integration of the peer-to-peer payment platform and the payment processing platform (e.g., via the API), the server(s) 1002 and/or 1102 associated with each can exchange communications with each other— and with a payment application 11 18 associated with the peer-to-peer payment platform and/or the POS application 1018—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1108(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 1018 and the payment application 1118, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1108(A), can be specially configured as a buyer-facing device that can enable the customer to view cart building in near real-time, interact with a transaction during cart building using the customer computing device, authorize payment via, the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 1018, associated with a payment processing platform, on the merchant device 1008(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 1008(A) can present a QR code, or other transaction code, that can be associated with a peer-to-peer payment platform. The customer can use a camera associated with the user device 1108(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 1018, associated with a payment processing platform on the merchant device 1008(A). In an example, the merchant can use the payment processing platform to process payments, and the payment processing platform can process payments for the merchant, as well as other merchants. That is, the payment processing platform, can be an aggregator. After adding the first item, or otherwise providing an indication to start a transaction, the POS application 1018 can cause a text message with a resource locator (e.g., uniform resource locator (URL)) that can be associated with a peer-to-peer payment platform to be sent to the user device 1108(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1108(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 1018 of a merchant device 1008(A) at a brick-and-mortar store of a merchant to a payment application 1118 of a user device 1108(A) of a customer to enable the customer to participate in a transaction via their own computing device. For instance, in a "scan to pay" example as described above, based at least in part on capturing the QR code, or other transaction code, via the user device 1108(A), the payment processing platform can provide transaction data to the peer-to-peer payment platform for presentation via the payment application 1118 on the user device 1108(A). In some examples, the customer can watch items being added to their cart (e.g., via a user interface presented via the payment application). As an item is added to a virtual cart by the merchant—via the POS application 1018 on the merchant device 1008(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1118 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1108(A) during or after payment of the transaction.

In some examples, based at least in part on capturing the QR code, or other transaction code, the payment processing platform can provide transaction data to the peer-to-peer payment platform for presentation via the payment application 1118 on the computing device of the customer, such as the user device 1108(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1118 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyally information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 1018, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1118 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 14:
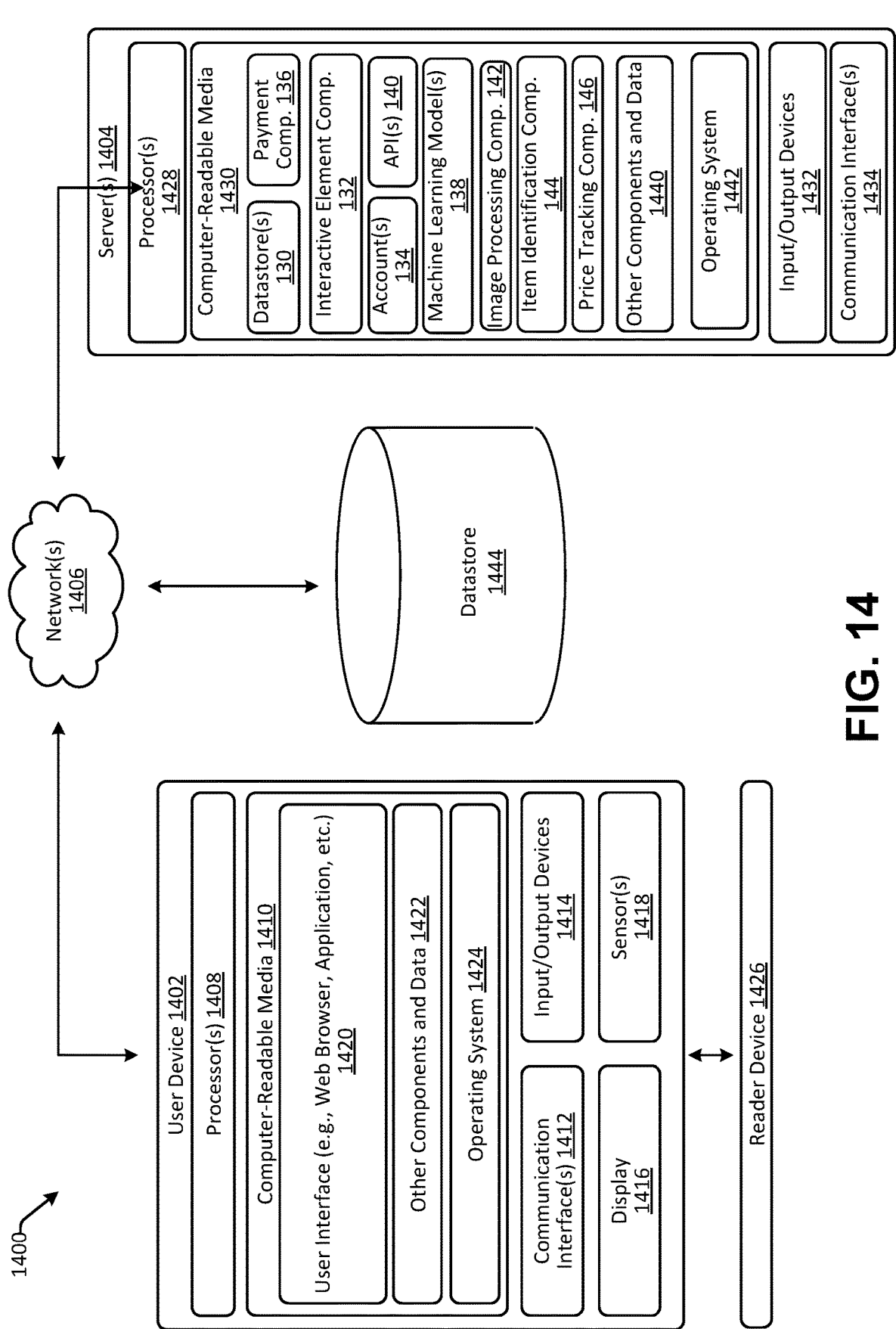
FIG. 14 is an illustrative block diagram illustrating a system for performing techniques described herein, according to an embodiment described herein.

FIG. 14 is an illustrative block diagram illustrating a system for performing techniques described herein, according to an embodiment described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 14.

The user device 1402 may be the same or similar to the user device 102 as described with respect to FIG. 1. Additionally, the server(s) 1404 may be the same or similar to the payment service 104 described with respect to FIG. 1.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, components or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider associated with the server(s) 1404, or which can be an otherwise dedicated application. In some examples, the user interface 1420 can be configured to display options for withdrawing funds to make donations. The user interface 1420 may also be configured to surface information about donations. It should be understood that the user interface 1420 can be configured to display, facilitate, or otherwise perform any of the interactions described herein with respect to transactions or other operations as described herein. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other components and data 1422, which can include programs, drivers, etc., and the data used or generated by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1424, described above, to provide one or more services. That is, in some examples, the service provider 1424 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1414 and/or for sending users 1414 notifications regarding available appointments with merchant(s) located proximate to the users 1414. In at least one example, location can be used for taking payments from nearby customers when they leave a geofence, or location can be used to initiate an action responsive to users 1414 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1426 may also include a biometric sensor to receive and process biometric characteristics and process them as payment instruments, given that such biometric characteristics are registered with the payment service 104 and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more components and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one component for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock 1412, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units, and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program components, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider and/or payment processing service. Functional components stored in the computer-readable media 1430 can optionally include the components described with respect to the CRM 128 from FIG. 1, as shown in FIG. 14.

The other components may include a training component that can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1402 and/or the server(s) 1404 for use at a time after the data models have been trained (e.g., at runtime).

The one or more other components and data 1440 can include programs, drivers, etc., and the data used or generated by the functional components. Further, the server(s) 1404 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include a datastore 1444 that can be configured to store data that is accessible, manageable, and updatable. In some examples, the datastore 1444 can be integrated with the user device 1402 and/or the server(s) 1404. In other examples, as shown in FIG. 14, the datastore 1444 can be located remotely from the server(s) 1404 and can be accessible to the server(s) 1404. The datastore 1444 can comprise multiple databases and/or servers connected locally and/or remotely via the network(s) 1406.

In at least one example, the datastore 1444 can store user profiles, which can include merchant profiles, customer profiles, and so on. In some examples, the datastore(s) 1444 can store user profiles of customers, merchants, the payment service, etc., as described herein. In some examples, such user profiles can be associated with one or more user accounts.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider 612.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1444 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1444 can store additional or alternative types of data as described herein.

EXAMPLE CLAUSES

1. A method implemented by at least one computing device of a service provider, the method comprising: receiving, from a device on which a payment application is stored, image data corresponding to an image that includes text, the text representing a list of items; parsing, utilizing optical text recognition techniques, a portion of the image data corresponding to the text from other portions of the image data; determining, from the portion of the image data, a first item of the list of items and a second item of the list of items; determining, utilizing interaction data from the payment service associated with the payment application and a machine-trained model, a first merchant offering corresponding to the first item from a first merchant; determining, utilizing the interaction data and the machine-trained model, a second merchant offering corresponding to the second item from a second merchant; receiving user input data to purchase the first merchant offering and the second merchant offering at a first time and to pay for at least a portion of a cost of the first item and the second item at a second time after the first time via an installment plan; facilitating, utilizing the payment service and in response to receiving the user input data, purchase of the first item associated with the first merchant offering from the first merchant; and the second item associated with the second merchant offering from the second merchant; and withdrawing, from a stored balance account associated with the device, an amount equal to an installment of the installment plan at the second time.

2. The method as clause 1 recites, wherein parsing the portion of the image data corresponding to the text includes: determining, utilizing computer vision techniques, an initial portion of the image data that corresponds to the list of items; determining, utilizing the computer visions techniques, that the portion of the image data includes words; and determining the words utilizing the optical recognition techniques.

3. The method as clause 1 and/or 2 recites, wherein the transaction data includes at least one of: merchant data indicating offerings by merchants associated with the payment service; transaction data indicating prior transactions associated with the merchants; or appointment data indicating availability of the merchants to provide the items.

4. The method as any of clauses 1, 2, and/or 3 recite, further comprising: generating a machine learning model configured to determine merchant offerings from parsed image data; generating a training dataset that includes the parsed image data and results data indicating accuracy of determined merchant offerings by the machine learning model; and training the machine learning model utilizing the training dataset such that the machine-trained model is generated by changing one or more parameters of the machine learning model.

5. A system comprising: one or more processors; and non-transitory computer-readable media storing instructions that, when executed by the one or more processors, cause the system to perform operations comprising: receiving, from a device, image data corresponding to an image that includes text, the text representing a list of items; parsing a portion of the image data corresponding to the text from other portions of the image data; determining, from the portion of the image data, a first item of the list of items and a second item of the list of items; determining, utilizing interaction data from a payment service and a machine-trained model, a first merchant offering corresponding to the first item from a first merchant; determining, utilizing the interaction data and the machine-trained model, a second merchant offering corresponding to the second item from a second merchant; facilitating, utilizing the payment service, purchase of: the first item associated with the first merchant offering from the first merchant; and the second item associated with the second merchant offering from the second merchant; and withdrawing, from a stored balance account associated with the device, an amount equal to an installment of an installment plan at a time after when facilitating the purchase occurs.

6. The system as clause 5 recites, the operations further comprising: determining, from the portion of the image data, text characters representing the text; determining, utilizing natural language understanding techniques, words representing the text characters; and wherein determining the first merchant offering is based at least in part on: identifying candidate merchant offerings that include at least one of the words, phrases that correspond to the words, or representations of the words; ranking the candidate merchant offerings utilizing at least one of the machine-trained model or predefined rules; and selecting the first merchant offering based on the ranking.

7. The system as clause 5 and/or 5 recites, the operations further comprising: identifying, from the interaction data and the machine-trained model, candidate merchant offerings corresponding to the first item; causing display of a user interface on the device, the user interface configured to display: an item indicator representing the first item as identified; and indicators of the candidate merchant offerings ranked utilizing the machine-trained model; receiving user input data selecting the first merchant offering from the candidate merchant offerings; and wherein determining the first merchant offering is based at least in part on the user input data.

8. The system as any of clauses 5, 6, and/or 7 recite, the operation further comprising:

receiving user input data indicating a first price threshold for the first item and a second price threshold for the second item; and generating a command configured to cause the payment service to facilitate the purchase at a time when a current price of the first item satisfies the first price threshold and a current price of the second item satisfies the second price threshold.

9. The system as any of clauses 5, 6, 7, and/or 8 recite, the operations further comprising: determining, at a first time, that a current price of the first item satisfies a user-defined threshold price of the first item, wherein facilitating the purchase of the first item occurs at the first time based at least in part on the current price of the first item satisfying the user-defined threshold price of the first item; determining, at the first time, that a current price of the second item does not satisfy a user-defined threshold price of the second item; and generating a command configured to cause the payment service to facilitate the purchase of the second item at a second time when a price of the second item satisfies the user-defined threshold price of the second item.

10. The system as any of clauses 5, 6, 7, 8, and/or 9 recite, the operations further comprising: aggregating a cost of the first item and a cost of the second item such that an aggregated cost is determined; displaying, on the device, the aggregated cost and installment plan options, wherein individual ones of the installment plan options indicate at least one of: a total transaction price based on the aggregated cost and an installment plan cost; a frequency of installments for individual ones of the installment plan options; a number of installments for individual ones of the installment plan options; or a per-installment cost for individual ones of the installment plan options; receiving user input data selecting the installment plan from the installment plan options; and selecting the installment plan based at least in part on the user input data.

11. The system as clause 10 recites, wherein the installment plan options are caused to be displayed with an interactive element such that, an interaction with the interactive element causes modification of at least one of the total transaction price; the frequency of installments;

the number of installments in the installment plan; or the per-installment cost.

12. The system as any of clauses 5, 6, 7, 8, 9, 10, and/or 11 recite, wherein: facilitating the purchase of the first item occurs at a first time; the installment plan includes installment costs based at least in part on a cost of the first item; facilitating the purchase of the second item occurs at a second time after the first time; and the installment costs of the installment plan are updated based at least in part on a cost of the second item.

13. A computer-implemented method comprising: receiving, from a device, image data corresponding to an image that includes text, the text representing a list of items; parsing a portion of the image data corresponding to the text from other portions of the image data; determining, from the portion of the image data, a first item of the list of items and a second item of the list of items; determining, utilizing interaction data from a payment service, a first merchant offering corresponding to the first item from a first merchant; determining, utilizing the interaction data, a second merchant offering corresponding to the second item from a second merchant; and facilitating, utilizing the payment service, purchase of the first item associated with the first merchant offering from the first merchant; and the second item associated with the second merchant offering from the second merchant.

14. The computer-implemented method as clause 13 recites, wherein parsing the portion of the image data corresponding to the text includes: determining, utilizing the computer visions techniques, that the portion of the image data includes words; and determining the words utilizing the optical recognition techniques.

15. The computer-implemented method as clause 13 and/or 14 recites, wherein the transaction data includes appointment data indicating availability of the merchants to provide the items.

16. The computer-implemented method as any of clauses 13, 14, and/or 14 recite, further comprising: generating a machine learning model configured to determine merchant offerings from parsed image data; generating a training dataset that includes the parsed image data and results data indicating accuracy of determined merchant offerings by the machine learning model; and training the machine learning model utilizing the training dataset such that a machine-trained model is generated by changing one or more parameters of the machine learning model; and wherein determining the first merchant offering and the second merchant offering are performed utilizing the machine-trained model.

17. The computer-implemented method as any of clauses 13, 14, 15, and/or 16 recite, further comprising: generating a machine learning model configured to determine merchants to associate with the items identified from parsed image data; generating a training dataset that includes the parsed image data and results data indicating customer feedback of merchants associated with the items selected by the machine learning model; and training the machine learning model utilizing the training dataset such that a machine-trained model is generated by changing one or more parameters of the machine learning model; and selecting the first merchant and the second merchant utilizing the machine-trained model.

18. The computer-implemented method as any of clauses 13, 14, 15, 16, and/or 17 recite, further comprising: displaying, on the device, an aggregated cost of the first item and the second item and installment plan options, wherein individual ones of the installment plan options indicates a total transaction price based on the aggregated cost and an installment plan cost; and selecting an installment plan from the installment plan options based at least in part on user input data provided to the device.

19. The computer-implemented method as any of clauses 13, 14, 15, 16, 17, and/or 18 recite, wherein determining the first merchant offering and the second merchant offerings is based at least in part on transaction data associated with a user of the device, the transaction data indicating item characteristics of previously-purchased items associated with the user.

20. The computer-implemented method as any of clauses 13, 14, 15, 16, 17, 18, and/or 19 recite, further comprising withdrawing, from a stored balance account associated with the device, an amount equal to an installment of an installment plan at a time after when facilitating the purchase occurs.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 6-9 for convenience and ease of understanding. However, the methods illustrated are not limited to being performed using components described in FIGS. 1-5 and 10-14, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:

receiving, by one or more processors of one or more servers of a payment service and via an image sensor of a device on which a payment application associated with the payment service is stored, image data corresponding to an image that includes text, the text representing a list of items;

preprocessing, by the one or more processors, the image data, wherein preprocessing of the image data comprises one or more of:

re-sampling to confirm that an image coordinate system is correct, reducing image sensor noise, enhancing contrast, or conducting scale space representation of the image data to enhance image structures at locally-appropriate scales;

responsive at least in part to preprocessing the image data, identifying, by the one or more processors, via application of a computer vision model to the image data, a first portion of the image data corresponding to the list of items, wherein identifying the first portion comprises parsing the image data into the first portion and a second portion, wherein the second portion does not include any items of the list of items, and wherein the computer vision model is trained to identify at least one of one or more strings of text or one or more textual characteristics;

determining, by the one or more processors, using optical text recognition on the first portion of the image data, one or more first characters corresponding to a first item of the list of items and one or more second characters corresponding to a second item of the list of items, wherein the optical text recognition is based at least in part on pixel values;

receiving, by the one or more processors and from point-of-sale (POS) devices of a plurality of merchants associated with the payment service, transaction data associated with a plurality of transactions of the plurality of merchants, wherein a first transaction of the plurality of transactions comprises a purchase of the first item and a second transaction of the plurality of transactions comprises a purchase of the second item;

based at least in part on the transaction data, processing, by the one or more processors, respective payments for the plurality of transactions;

determining, by the one or more processors, utilizing the transaction data and a machine-trained model, a first merchant offering corresponding to the first item from a first merchant of the plurality of merchants;

determining, by the one or more processors, utilizing the transaction data and the machine-trained model, a second merchant offering corresponding to the second item from a second merchant of the plurality of merchants;

receiving, by the one or more processors via the payment application, an indication of user input to one or more user interfaces of the payment application, the user input comprising:

a first request to purchase the first merchant offering and the second merchant offering at a first time; and a second request to pay via an installment plan for at least a portion of a cost of the first item and the second item at a second time after the first time;

facilitating, by the one or more processors utilizing the payment service and in response to receiving the indication of the user input, purchase of:

the first item associated with the first merchant offering from the first merchant; and the second item associated with the second merchant offering from the second merchant; and withdrawing, by the one or more processors and from a stored balance account associated with the device, an amount equal to an installment of the installment plan at the second time.

2. The method as claim 1 recites, further comprising:

receiving, by the one or more processors, at least one of:

merchant data indicating offerings by at least one merchant of the plurality of merchants; or appointment data indicating availability of at least one merchant of the plurality of merchants to provide the items, wherein the first merchant offering and the second merchant offering are further determined based at least in part on the merchant data or the appointment data.

3. The method as claim 1 recites, wherein the pixel values correspond to intensity values in at least one spectral band or light values in at least one spectral band.

4. A system associated with a payment service, the system comprising:

one or more processors; and non-transitory computer-readable media storing instructions that, when executed by the one or more processors, cause the system to perform operations comprising:

receiving, via an image sensor of a device on which a payment application associated with the payment service is installed, image data corresponding to an image that includes text, the text representing a list of items;

preprocessing the image data, wherein preprocessing of the image data comprises one or more of:

re-sampling to confirm that an image coordinate system is accurate, reducing image sensor noise, enhancing contrast, or conducting scale space representation of the image data to enhance image structures relative to locale scales;

responsive at least in part to preprocessing the image data, identifying, via application of a computer vision model to the image data, a first portion of the image data corresponding to the list of items, wherein identifying the first portion comprises parsing the image data into the first portion and a second portion, wherein the second portion does not include any items of the list of items, and wherein the computer vision model is trained to identify at least one of one or more strings of text or one or more textual characteristics;

determining, using optical text recognition on the first portion of the image data, one or more first characters corresponding to a first item of the list of items and one or more second characters corresponding to a second item of the list of items, wherein the optical text recognition is based at least in part on pixel values;

receiving, from point-of-sale (POS) devices of a plurality of merchants associated with the payment service, transaction data associated with a plurality of transactions of the plurality of merchants, wherein a first transaction of the plurality of transactions comprises a purchase of the first item and a second transaction of the plurality of transactions comprises a purchase of the second item;

based at least in part on the transaction data, processing respective payments for the plurality of transactions;

determining, utilizing the transaction data and a machine-trained model, a first merchant offering corresponding to the first item from a first merchant of the plurality of merchants;

determining, utilizing the transaction data and the machine-trained model, a second merchant offering corresponding to the second item from a second merchant of the plurality of merchants;

receiving, via the payment application, an indication of user input to one or more user interfaces of the payment application, the user input comprising a request to purchase the first merchant offering and the second merchant offering;

facilitating, at a first time and utilizing the payment service, purchase of:

the first item associated with the first merchant offering from the first merchant; and the second item associated with the second merchant offering from the second merchant; and withdrawing, from a stored balance account associated with the device, an amount equal to an installment of an installment plan at a second time after the first time.

5. The system as claim 4 recites, wherein determining the first item of the list of items and the second item of the list of items comprises:

determining, from the first portion of the image data, text characters representing the text;

determining, utilizing natural language understanding techniques, words representing the text characters; and wherein determining the first merchant offering is based at least in part on:

identifying candidate merchant offerings that include at least one of the words, phrases that correspond to the words, or representations of the words;

ranking the candidate merchant offerings utilizing at least one of the machine-trained model or predefined rules; and selecting the first merchant offering based on the ranking.

6. The system as claim 4 recites, wherein the user input comprises a first user input, the operations further comprising:

identifying, from the transaction data and the machine-trained model, candidate merchant offerings corresponding to the first item;

causing display, via the one or more user interfaces, of:
an item indicator representing the first item as identi-
fied; and
indicators of the candidate merchant offerings ranked
utilizing the machine-trained model;
receiving an indication of a second user input to at least
one of the one or more user interfaces of the payment
application selecting the first merchant offering from
the candidate merchant offerings; and
wherein determining the first merchant offering is based at
least in part on the second user input.

7. The system as claim 4 recites, wherein the user input
comprises a first user input, the operations further compris-
ing:
receiving an indication of a second user input to at least
one of the one or more user interfaces of the payment
application indicating a first price threshold for the first
item and a second price threshold for the second item;
and
generating a command configured to cause the payment
service to facilitate the purchase at the first time,
wherein the first time corresponds to when a current
price of the first item satisfies the first price threshold
and a current price of the second item satisfies the
second price threshold.

8. The system as claim 7 recites, wherein the request is a
first request, the operations further comprising:
sending, by the one or more processors at the first time, a
second request for a confirmation for the payment
service to facilitate the purchase; and
receiving, by the one or more processors, the confirmation
to facilitate the purchase,
wherein facilitating the purchase is responsive to receiv-
ing the confirmation.

9. The system as claim 4 recites, the operations further
comprising:
determining, at the first time, that a current price of the
first item satisfies a user-defined threshold price of the
first item, wherein facilitating the purchase of the first
item occurs at the first time based at least in part on the
current price of the first item satisfying the user-defined
threshold price of the first item.

10. The system as claim 4 recites, wherein the user input
comprises a first user input, the operations further compris-
ing:
aggregating a cost of the first item and a cost of the second
item such that an aggregated cost is determined;
displaying, on the device, installment plan options and the
aggregated cost, wherein individual ones of the install-
ment plan options indicate at least one of:
a total transaction price based on the aggregated cost
and an installment plan cost;
a frequency of installments for individual ones of the
installment plan options;
a number of installments for individual ones of the
installment plan options; or
a per-installment cost for individual ones of the install-
ment plan options;
receiving a second user input to at least one of the one or
more user interfaces selecting the installment plan from
the installment plan options; and
selecting the installment plan based at least in part on the
second user input.

11. The system as claim 10 recites, wherein the install-
ment plan options are caused to be displayed with an
interactive element such that, an interaction with the inter-
active element causes modification of at least one of:

the total transaction price;
the frequency of installments;
the number of installments in the installment plan; or
the per-installment cost.

12. The system as claim 11 recites, wherein the interactive
element comprises a slider.

13. The system as claim 4 recites, wherein facilitating the
purchase at the first time comprises:
facilitating the purchase of the first item, and wherein the
installment plan includes installment costs based at
least in part on a cost of the first item; and
facilitating the purchase of the second item, wherein the
installment costs of the installment plan are updated
based at least in part on a cost of the second item.

14. The system as claim 4 recites, wherein identifying the
first portion further comprises extracting image features,
wherein the image features comprise one or more of lines,
edges, ridges, localized interest points, or shape features.

15. A computer-implemented method implemented at
least in part by one or more servers of a payment service,
comprising:
receiving, by one or more processors of the one or more
servers, an image sensor of a device on which a
payment application associated with the payment ser-
vice is stored, image data corresponding to an image
that includes text, the text representing a list of items;
preprocessing, by the one or more processors, the image
data, wherein preprocessing of the image data com-
prises one or more of:
re-sampling to confirm that an image coordinate system
is spatially correct,
reducing image sensor noise,
enhancing contrast, or
conducting scale space representation of the image data
to enhance image structures relative to locale scales;
responsive at least in part to preprocessing the image data,
identifying, by the one or more processors via appli-
cation of a computer vision model to the image data, a
first portion of the image data corresponding to the list
of items, wherein identifying the first portion comprises
parsing the image data into the first portion and a
second portion, wherein the second portion does not
include any items of the list of items, and wherein the
computer vision model is trained to identify at least one
of one or more strings of text or one or more textual
characteristics;
determining, by the one or more processors using optical
text recognition on the first portion of the image data,
one or more first characters corresponding to a first
item of the list of items and one or more second
characters corresponding to a second item of the list of
items, wherein the optical text recognition is based at
least in part on pixel values;
receiving, by the one or more processors from point-of-
sale (POS) devices of a plurality of merchants associ-
ated with the payment service, transaction data associ-
ated with a plurality of transactions of the plurality of
merchants, wherein a first transaction of the plurality of
transactions comprises a purchase of the first item and
a second transaction of the plurality of transactions
comprises a purchase of the second item;
based at least in part on the transaction data, processing,
by the one or more processors, respective payments for
the plurality of transactions;

determining, by the one or more processors and utilizing the transaction data, a first merchant offering corresponding to the first item from a first merchant of the plurality of merchants;

determining, by the one or more processors and utilizing the transaction data, a second merchant offering corresponding to the second item from a second merchant of the plurality of merchants;

receiving, by the one or more processors and via the payment application, an indication of user input to one or more user interfaces of the payment application, the user input comprising a request to purchase the first merchant offering and the second merchant offering; and facilitating, by the one or more processors and utilizing the payment service, purchase of:

the first item associated with the first merchant offering from the first merchant; and the second item associated with the second merchant offering from the second merchant.

16. The computer-implemented method as claim 15 recites, further comprising:

generating, by the one or more processors, a machine learning model configured to determine merchant offerings from parsed image data;

generating, by the one or more processors, a training dataset that includes the parsed image data and results data indicating accuracy of determined merchant offerings by the machine learning model;

training, by the one or more processors, the machine learning model utilizing the training dataset such that a machine-trained model is generated by changing one or more parameters of the machine learning model; and wherein determining the first merchant offering and the second merchant offering are performed utilizing the machine-trained model.

17. The computer-implemented method as claim 15 recites, further comprising:

generating, by the one or more processors, a machine learning model configured to determine merchants of the plurality of merchants to associate with the items identified from parsed image data;

generating, by the one or more processors, a training dataset that includes the parsed image data and results data indicating customer feedback of the merchants associated with the items selected by the machine learning model;

training, by the one or more processors, the machine learning model utilizing the training dataset such that a machine-trained model is generated by changing one or more parameters of the machine learning model; and selecting, by the one or more processors, the first merchant and the second merchant utilizing the machine-trained model.

18. The computer-implemented method as claim 15 recites, wherein the user input comprises a first user input, further comprising:

displaying, by the one or more processors and on the device, installment plan options and an aggregated cost of the first item and the second item, wherein individual ones of the installment plan options indicates a total transaction price based on the aggregated cost and an installment plan cost; and selecting, by the one or more processors, an installment plan from the installment plan options based at least in part on a second user input to at least one of the one or more user interfaces.

19. The computer-implemented method as claim 15 recites, wherein determining the first merchant offering and the second merchant offering is based at least in part on a subset of transaction data associated with a user of the device, the subset of the transaction data associated with a user of the device indicating item characteristics of previously-purchased items associated with the user.

20. The computer-implemented method as claim 15 recites, further comprising withdrawing, by the one or more processors and from a stored balance account associated with the device, an amount equal to an installment of an installment plan at a time after when facilitating the purchase occurs.

* * * * *